(12) United States Patent  
Gordon

(10) Patent No.: US 7,241,382 B2
(45) Date of Patent: Jul. 10, 2007

(54) METHOD AND SYSTEM FOR FILTERING SEDIMENT-BEARING FLUIDS

(75) Inventor: Robert R. Gordon, Santa Fe, NM (US)

(73) Assignee: Gordon Construction Inc., Espanola, MN (US)

( * ) Notice: Subject to any disclaimer, the term of this patent is extended or adjusted under 35 U.S.C. 154(b) by 347 days.

(21) Appl. No.: 10/797,290

(22) Filed: Mar. 10, 2004

(65) Prior Publication Data

US 2005/0139531 A1    Jun. 30, 2005

Related U.S. Application Data

(63) Continuation-in-part of application No. 10/277,225, filed on Oct. 18, 2002, now Pat. No. 6,875,364, which is a continuation-in-part of application No. 10/082,626, filed on Feb. 21, 2002, now Pat. No. 6,758,344.

(51) Int. Cl.
    *B01D 35/16* (2006.01)
(52) U.S. Cl. .......................... 210/209; 55/301; 55/492; 210/409; 210/436; 210/448; 210/485
(58) Field of Classification Search .......... 55/284–288, 55/301, 490, 492; 210/107, 108, 202–209, 210/258, 332, 333.1, 409, 411, 436, 448, 210/452, 460, 472, 485, 702, 764, 777, 778, 210/791, 797, 798; 417/40
    See application file for complete search history.

(56) References Cited

U.S. PATENT DOCUMENTS

| | | | |
|---|---|---|---|
| 1,750,935 A | 3/1930 | Maunula et al. | |
| 2,024,646 A * | 12/1935 | Jones | 210/288 |
| 2,046,770 A | 7/1936 | Coberly et al. | |
| 2,279,838 A | 4/1942 | Oliver | |
| 2,322,586 A | 6/1943 | Oliver | |
| 2,772,786 A | 12/1956 | Gardes | |
| 3,193,103 A | 7/1965 | Snyder | |
| 3,262,878 A * | 7/1966 | Beckley et al. | 210/709 |
| 3,574,509 A | 4/1971 | Zentis et al. | |
| 3,647,071 A | 3/1972 | Lamort | |
| 4,169,792 A | 10/1979 | Dovel | |
| 4,210,538 A | 7/1980 | Tantillo et al. | |
| 4,210,539 A * | 7/1980 | Shiban | 210/391 |
| 4,297,209 A | 10/1981 | DeVisser et al. | |
| 4,504,288 A | 3/1985 | Kreft | |
| 4,518,501 A | 5/1985 | Lennartz et al. | |
| 4,655,910 A | 4/1987 | Tabor | |
| 4,655,911 A | 4/1987 | Tabor | |
| 4,818,420 A | 4/1989 | Mims | |
| 4,977,958 A | 12/1990 | Miller | |

(Continued)

FOREIGN PATENT DOCUMENTS

GB    2354 185 A    3/2001

*Primary Examiner*—Joseph Drodge
(74) *Attorney, Agent, or Firm*—Knobbe, Martens, Olson & Bear, LLP

(57) ABSTRACT

A self-cleaning, back-washable filter apparatus and method for use with a pumping apparatus which is at least partially immersed in fluid. The filter apparatus may comprise a vibration device that is powered by a flow of fluid. A method for filtering a flow of fluid is also disclosed, comprising vibrating a filter by applying a flow of fluid to the filter.

12 Claims, 30 Drawing Sheets

U.S. PATENT DOCUMENTS

| | | |
|---|---|---|
| 5,246,580 A | 9/1993 | Stedfeldt |
| 5,370,791 A | 12/1994 | Lescovich et al. |
| 5,401,396 A | 3/1995 | Lescovich et al. |
| 5,690,824 A | 11/1997 | Stuth |
| 5,910,249 A | 6/1999 | Kopp et al. |
| 6,139,727 A | 10/2000 | Lockwood |
| 6,155,430 A | 12/2000 | Goodman |
| 6,231,764 B1 | 5/2001 | Wilkins |
| 6,283,305 B1 | 9/2001 | Maeda et al. |
| 6,758,344 B2 | 7/2004 | Gordon |
| 6,790,345 B2 * | 9/2004 | Broussard .................. 210/122 |
| 6,875,364 B2 | 4/2005 | Gordon |
| 2002/0054818 A1* | 5/2002 | Odd ............................ 417/40 |

* cited by examiner

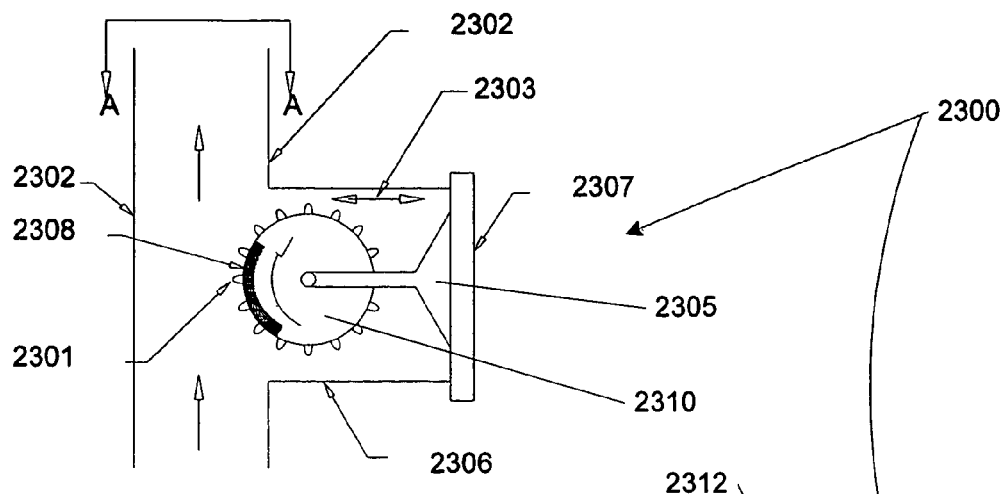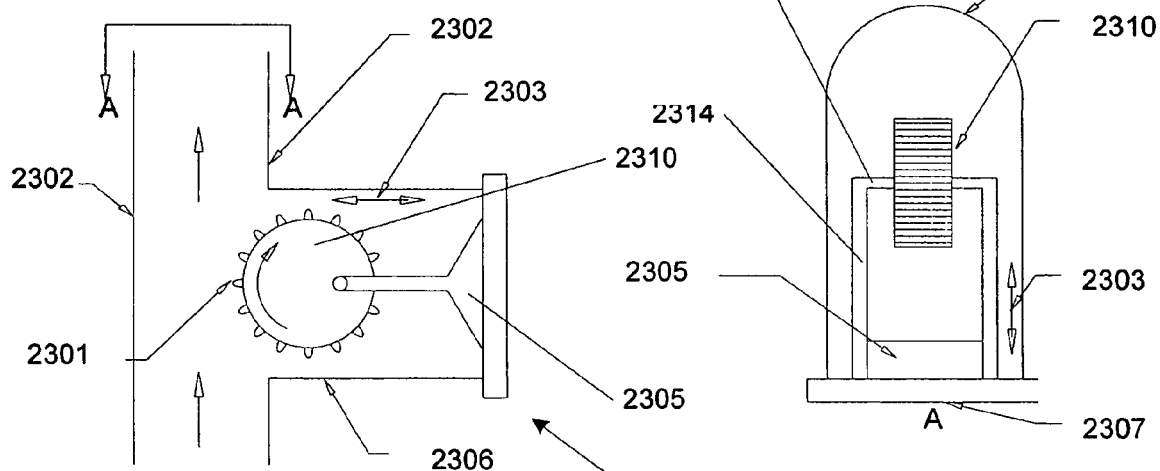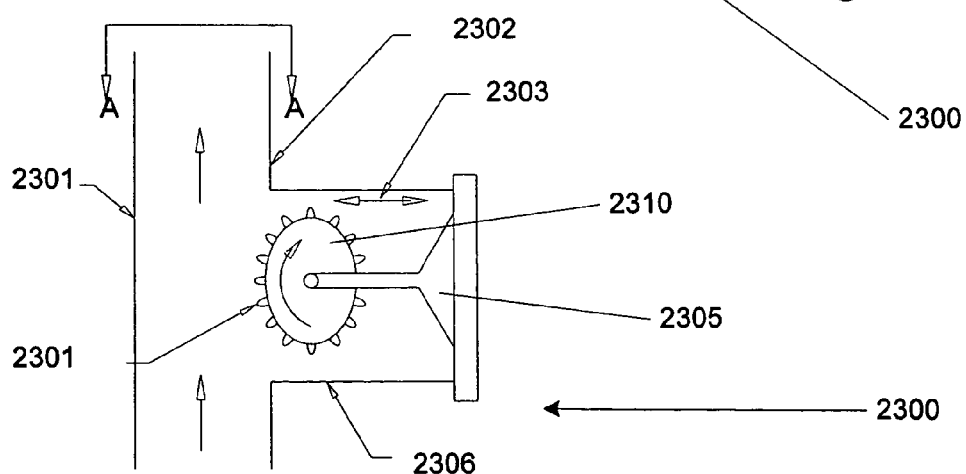

METHOD AND SYSTEM FOR FILTERING SEDIMENT-BEARING FLUIDS

RELATED APPLICATIONS

This application is a continuation in part of U.S. application Ser. No. 10/277,225, filed Oct. 18, 2002 now U.S. Pat. No. 6,875,364 entitled "SELF-CLEANING FLUID FILTER SYSTEM", which is a continuation-in-part application of U.S. application Ser. No. 10/082,626, filed Feb. 21, 2002 now U.S. Pat. No. 6,758,344. Each of the foregoing applications is herein incorporated by reference in its entirety.

BACKGROUND OF THE INVENTION

1. Field of the Invention

The invention relates to a filter apparatus and more particularly to a self-cleaning, back-flushable filter for removing particulate material from a pump intake.

2. Description of the Related Art

Submersible pumps are often lowered into fluid supplies such as those found in well casings or ponds in order to remove the fluid that is found there. Often, the fluid contains sand and other abrasive particles that are a constant cause of inefficiency in and potential failure of the pumping systems. For example, sand can cause severe damage to the pump and valves in the pumping system.

Many types of filters have been designed for use with submersible pumps. Such filters have typically included a filter element designed to screen particulate material from the pump intake. However, the particulate material often becomes entrapped in the filter element. The quantity of particulate material collected on the filter element is directly proportional to the to the pressure drop that occurs across the filter element. Since an excessive pressure drop across the filter element can significantly reduce fluid flow, the filter element must be periodically changed or cleaned. Often, this is done by removing the submersible pump from the fluid and removing the filter element. This can be a timely and inconvenient process. Pumps with intricate backwashing systems have been designed, but these are often expensive and cannot be used to retrofit existing systems. As a result, many pumps are generally operated without any filter and therefore experience early pump failure and extensive and costly down time.

There exists, therefore, a continuing need for further improvements in fluid filter devices having a self-cleaning filter element. There further exists the need to have a relatively simple and reliable manner of backwashing filter elements used with an existing pump.

To clean water down to hyperfiltration, nanofiltration and ultrafiltration sizes, cross flow filtration with a pressure gradient has been employed. While this has proven successful, it is also expensive due to the disposal and/or treatment of resulting concentrate of contaminants. New methods are needed to eliminate or drastically reduce the concentrate in order to provide low cost filtration of fluids, such as drinking water.

SUMMARY OF THE INVENTION

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of the Embodiments of the Invention" one will understand how the features of this invention provide advantages that include water filtration systems having lowered maintenance costs.

One embodiment is a self-cleaning filtration system for filtering a fluid flow. The system may include a cage and one or more filters disposed within the cage. At least one pipe is configured to receive water through each filter. The cage may include a non-permeable leading member configured to meet and divert the fluid flow. The filters are configured to be placed downstream of the leading member. The cage may also include a trailing member and a bottom member configured to secure the cage. At least one side member may coupled to the leading and trailing members and coupled to the bottom member. The side members are angled inwardly with respect to a centroid defined by the cage from the leading member to the trailing member.

Another embodiment is a method of pumping fluid from a flow of fluid. The method comprises diverting the flow of fluid around a front member. A first portion of the flow of fluid through an outer mesh is filtered. The outer mesh is configured with respect to the flow of fluid and the front member so that the fluid flow carries debris away from the outer mesh. The first portion of fluid is filtered through a second filter mesh that performs finer filtering than the outer mesh. The fluid received through the second filter mesh is removed away from the second mesh.

Still another embodiment of a self-cleaning filtration system for filtering a fluid flow comprises a means for diverting a flow of fluid, and first means for filtering a first portion of the flow of fluid. The first means for filtering is configured with respect to the flow of fluid and the means for diverting so that the flow of fluid carries debris away from the first means for filtering. The system also includes second means for filtering the first portion of fluid. The second means for filtering performs finer filtering that the first means for filtering. The system also includes means for removing the fluid received through the second filter mesh.

A further embodiment is a sediment removal system. The sediment removal system may include a sediment discharge pipe having a vacuum inlet, a high pressure pipe, a venturi pump coupling the high pressure pipe to the sediment discharge pipe, a plurality of venturi jets fluidly coupling the high pressure pipe to the sediment discharge pipe, a vessel fluidly coupled to the sediment discharge pipe and configured to retain sediment in fluid received from the sediment discharge pipe, and a pressure booster pump connected to the high pressure pipe and configured to pressurize fluid in the high pressure pipe.

Another embodiment is a filtration system. The filtration system may comprise at least one pressure tube, an impermeable member defining a first chamber within the pressure tube. The first chamber has an inlet and an outlet. At least one first filter surrounds the inlet so as to form a second chamber around the inlet. A filtered fluid pipe is disposed within the pressure tube and fluidly connected to the second chamber. A vent tube extends into the pressure tube and has a first opening to air outside of the pressure tube and a second opening into the second chamber. The vent tube is configured to expose the second chamber to the atmosphere. A pressure tight seal covers the outlet of the first chamber. The vent tube passes into the second chamber through the pressure tight seal.

Still another embodiment is fluid filtration system. The system may include an impermeable pressure tube. A fluid pipe is disposed within the pressure tube. At least one fluid inlet pipe is disposed within the pressure tube. At least one filter defines a fluid chamber around the at least one inlet pipe. A pressure tight seal is on each end of the pressure tube. In one embodiment, the filter is a cross flow membrane.

Yet another embodiment of a filtering system comprises a first pump, an outer tube configured to be at least partially submerged and fluidly coupled to the first pump, a second pump, and an inner tube, disposed within the outer tube and fluidly connected to the second pump. A filter is connected to the inner tube and defines a chamber that encloses an inlet to the inner tube.

An embodiment of a method for filtering fluid includes pumping a first flow of fluid through a filter and away from the filter. A second flow of fluid is directed generally parallel to a surface of the filter. The second flow is along a surface of the filter. The first flow comprises a portion of the second flow. The second flow is discharged through an outlet.

Another embodiment of the invention is a system for filtering a fluid comprising means for pumping a first flow of fluid through a filter and away from the filter, and means for directing a second flow of fluid generally parallel to a surface of the filter. The second flow is along a surface of the filter and away from the filter. The first flow comprises a portion of the second flow. The system also includes means for discharging the second flow from the means for directing.

Yet another embodiment of the invention is a filter apparatus for use with a pump. The filter apparatus comprises a filter element, a supply line for delivery of a flushing medium, and a filter basket at least partially enclosed in the filter element. The filter basket comprises a manifold and a plurality of tubes at least partially enclosed within the filter element. The manifold comprises a first member having an opening so as to receive the supply line, a second member having a plurality of apertures, the first and second members defining an internal chamber fluidly connecting the flushing medium supply opening with the plurality of apertures, and a blocking member positioned in the internal chamber and configured to rotatably traverse a groove in the second member and periodically block a flow of flushing fluid from the flushing medium supply opening to the plurality of apertures. Each of the plurality of tubes extends from one of the plurality of apertures and includes a plurality of perforations such that a flushing medium may flow from the supply line through the internal chamber into the plurality of tubes and through the perforations to backflush the filter element.

Another embodiment of the invention is a filter apparatus, which comprises a filter element, a pipe coupled to the filter element and configured to receive a flow of a fluid, a flange disposed within the pipe and projecting from an inner member of the pipe into the flow of the fluid; and a body rotatably mounted to the flange. The body is configured to rotate in response to the flow of the fluid and to translate at least a portion of the rotation into a vibratory motion of the pipe.

Still another embodiment of the invention is a method of filtering a fluid. A first flow of fluid is filtered through a filter apparatus. A second flow of fluid is applied to the filter apparatus so as to vibrate the filter apparatus.

A further embodiment of the invention is a filter apparatus, which comprises means for filtering a first flow of fluid, and means for vibrating the means for filtering. The means for vibrating is powered, at least in part, by a second flow of fluid.

Another embodiment of the invention is a filter apparatus for use with a pump. The filter apparatus may include a filter element, a first supply line for delivery of a flushing medium, a second supply line for delivery of an enhancing material, and a filter basket at least partially enclosed in the filter element. The filter basket may comprise a manifold, a first plurality of tubes at least partially enclosed in the filter element, and a second plurality of tubes at least partially surrounding the filter element. The manifold comprises a first member having a first opening so as to receive the first supply line and a second opening so as to receive the second supply line. A second member of the manifold has a first plurality of apertures and a second plurality of apertures. The first and second members define a first internal chamber fluidly connecting the first opening with the first plurality of apertures. The first and second members also define a second internal chamber fluidly connecting the second opening with the second plurality of apertures. Each tube of the first plurality of tubes extends from one of the first plurality of apertures and includes a first plurality of perforations such that a flushing medium may flow from the first supply line through the internal chamber into the first plurality of tubes and through each of the first plurality of perforations to backflush the filter element. Each tube of the second plurality of tubes extends from one of the second plurality of apertures and includes a second plurality of perforations such that a enhancing material may flow from the second supply line through the internal chamber into the second plurality of tubes and through each of the second plurality of perforations.

Still another embodiment of the invention is a method of filtering a fluid. The method comprises filtering a first flow of fluid through a filter. The filter is back flushed with a second flow of fluid. An enhancing material is introduced to a region in proximity to the filter through a third flow of fluid. The backflushing may be performed independently of the act of introducing.

An additional embodiment of the invention is a filter apparatus which includes means for filtering a first flow of fluid, means for backflushing the filter with a second flow of fluid, and means for introducing a third flow of fluid, which may include an enhancing material, to a region in proximity to the means for filtering. The means for back flushing is fluidly separated from the means for introducing.

BRIEF DESCRIPTION OF THE DRAWINGS

FIGS. 23A, 23B, 23C, and 23D depict additional embodiments of a vibration device for reducing caking or clogging in a filter system.

DETAILED DESCRIPTION OF EMBODIMENTS OF THE INVENTION

Embodiments of the invention will now be described with reference to the accompanying Figures, wherein like numerals refer to like elements throughout. The terminology used in the description presented herein is intended to be interpreted in its broadest reasonable manner in accordance with its ordinary use in the art and in accordance with any overt definitions provided below. Arrows not emanating from a numeral indicate a direction of fluid or gas flow.

Figure 1:
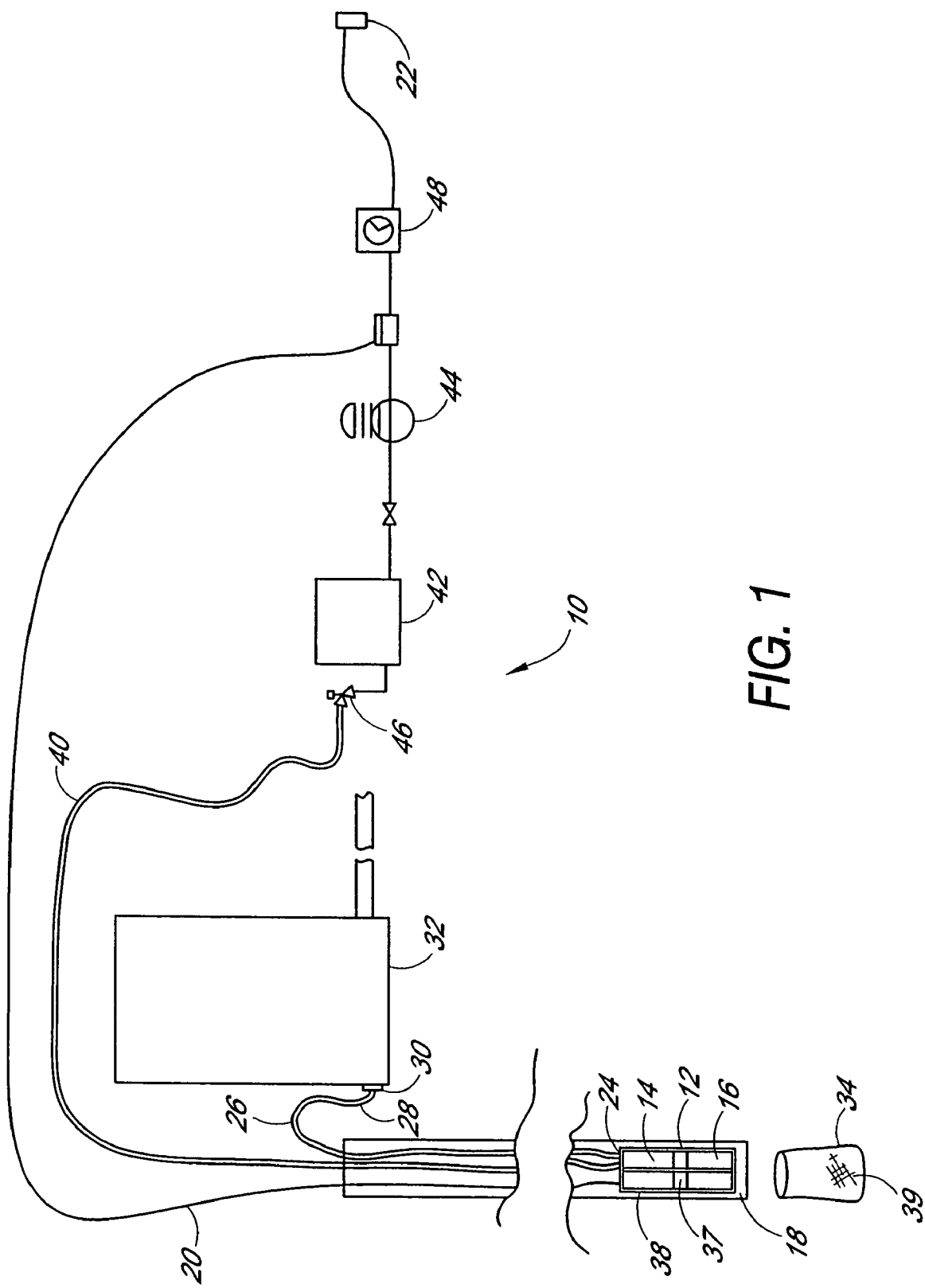
FIG. 1 is a schematic diagram of one embodiment of a system for pumping fluid using a self-cleaning filter apparatus according to one aspect of the invention.

Referring now to FIG. 1, a system 10 for pumping fluid from a well using a self-cleaning filter apparatus 12 is illustrated. The filter apparatus 12 encloses a submersible pump 14 in combination with an electric motor 16. The submersible pump 14 and electric motor 16 are preferably contained in a common housing and can be of conventional design. In one embodiment, the filter apparatus 12 and pump 14 are lowered into a typical well casing 18. An electrical supply line 20 connects an appropriate electrical power source 22 to the electric motor 16. A first end 24 of a pump discharge line 26 connects to the submersible pump 14. A second end 28 of the pump discharge line 26 is attached to a fitting 30 on a typical fluid tank 32 used for storing the pumped fluid. In operation, the filter apparatus 12 substantially prevents abrasive materials, such as sand, of a size that is equal to or greater than a predetermined size from entering the submersible pump 14. Although this embodiment illustrates the filter apparatus 12 being used with a system 10 to pump and filter water from a well casing 18, one skilled in the art will understand that the filter apparatus 12 can be used to filter other liquids or slurries, such as oil, gas, sewage, chemicals, industrial waste, and can be used to pump 14 liquids from oceans, lakes, rivers, ponds, streams, dewatering projects or any other source to any desired collection location. While FIG. 1 illustrates a submersible pump 14, some embodiments will not utilize a submersible pump 14, but rather will use a pump (not shown) above the surface of the fluid being pumped or near the tank 32. In such embodiments, only a suction end 24 of the line 26 will be used and the suction end 24 will be located in the filter apparatus 12.

The filter apparatus 12 has a filter element 39 (removed for clarity purposes) to screen out unwanted particles and abrasive materials such as sand and the like. In one embodiment, the filter element 39 is a filter sock 34 made of a synthetic fabric with 10-micron openings. One skilled in the art will understand that other filter elements 39 and/or different sized fabric openings designed to filter particulate material such as sand can also be used. For example, the filter element 39 can be a tube or filter material wrapped around the filter apparatus 12. As will be apparent from this description, any renewable filter capable of cleaning by backflushing can be used. Such filters include large mesh filters for filtering sand or rocks or other debris from water, or very small mesh filters and semi-permeable membranes capable of filtering microscopic or even ionic particles from water, such as those capable of desalinating seawater for example. During the filtering operation, some of the particulate matter that the filter sock 34 screens out collects on the filter fabric. The quantity of particulate matter collected on the fabric of the filter sock 34 directly affects the pressure drop across the filter sock 34. Since an excessive pressure drop across the filter sock 34 can significantly reduce fluid flow and thereby adversely impact the performance of the pump 14, the filter sock 34 must be periodically changed or appropriately backwashed or flushed to clean the accumulated particulate material therefrom. One option, when the performance of the pump 14 drops to an unacceptable level, is to pull the pump 14 and filter apparatus 12 out of the well casing 18 and remove the filter sock 34 for cleaning or replacement. However, a more convenient and time saving remedy is available through back-washing or reverse-flushing the filter sock 34.

In one embodiment, such back-washing is accomplished by directing bursts of air to the interior of the filter apparatus 12 and spraying this air forcefully in an outwardly direction against interior surfaces of the filter sock 34. Such spraying action is created by use of relatively thin and elongated tubes 38 which have minute perforations or jets distributed along their lengths, and which are fed from an air source as will be more fully discussed below with respect to FIG. 2. Air bursts from the perforations impinge upon the interior surfaces of the filter sock 34 and dislodge or expel entrapped particulate material. The diameter of the tubes 38 determines the spacing between a pump suction inlet 37 on the pump 14 and the filter sock 34 by supplying a separation gap equal to the diameter of the tubes 38 between the filter sock 34 and the pump suction inlet 37. The tubes 38 prevent the filter sock 34 from being sucked into the pump fluid inlet. This permits substantially the entire area of the filter sock 34 to be utilized for filtering fluid flow.

The filter sock 34 is wrapped with an outer layer 39 made from a metal or plastic mesh-like material or perforated sheet material. The outer layer 39 protects the filter sock 34 from tearing while inserting the pump 14 and filter apparatus 12 in the well casing 18 or from snagging on rocks or sticks when the pump 14 is used in ponds or streams. The outer layer 39 also limits deformation of the filter sock 34 from the force of the blast of air during the cleaning process.

A conduit, such as a supply hose 40, is connected to the filter apparatus 12 for supplying a pressurized gas or liquid used to flush the filtered particles screened by the filter apparatus 12. In one embodiment, the supply hose 40 connects an air supply tank 42 to the filter apparatus 12. Although the following embodiment uses air, any other gas, such as carbon dioxide, nitrogen, chlorine dioxide, anolyte, and the like, can be used. Alternately, a fluid, such as water can be used to flush the filter apparatus 12. An air compressor 44 pressurizes the air in the air supply tank 42. In one embodiment, a relief valve 46 is located in the air supply hose 40 between the air supply tank 42 and the filter apparatus 12. When it is desired to clean the filter, an operator turns on the compressor 44 and the pressure in the air supply tank begins to increase. When the pressure in the air supply tank 42 reaches the appropriate pressure, the relief valve 46 opens to allow a burst of air to be directed to the interior of the filter apparatus 12. In another embodiment, the relief valve 46 is replaced by a manual valve (not shown) in the air supply hose 40 between the air supply tank 42 and the filter apparatus 12 allowing an operator to provide a burst of air to the interior of the filter apparatus 12 either manually or through the use of a remotely operated valve. In one embodiment the valve is a solenoid valve allowing the flow of cleaning air to be controlled remotely by a switch or other remote control.

A control panel 48 may be provided that cooperates with the filter apparatus 12 and/or relief valve 46 such that the frequency of flushing can be programmed or occur in response to any desired signal. This allows the user to have greater flexibility in selecting when a flushing cycle is to be performed. Also, the allowable time for flushing can be pre-established and programmed into the control panel. Such a program is not necessary to perform any of the above cleaning procedures, since a user may effect such a cleaning procedure manually or semi-automatically. Use of such a control panel 48, however, allows for programming and automatic cleaning to suit a particular installation. Although not illustrated, some embodiments will use any number of pressure or temperature sensors to transmit signals to the control panel 48 from various sensing points in the system 10. These points may include the pump suction or discharge pressure, the air tank 42 pressure, or the flushing supply hose 40 supply pressure for example.

Figure 2:
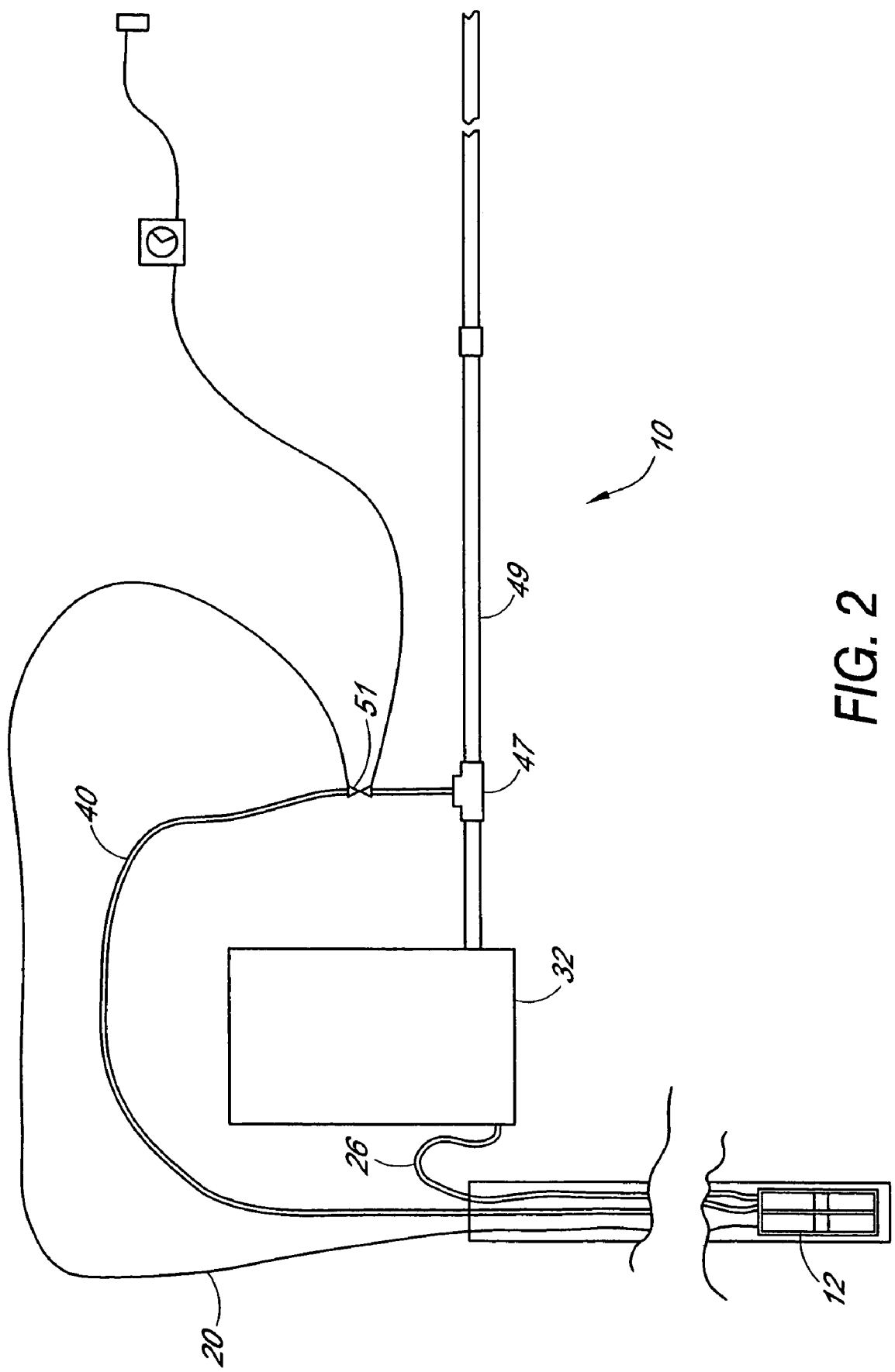
FIG. 2 is a schematic diagram of another embodiment of a system using the self-cleaning filter apparatus of FIG. 1 which uses the fluid being pumped to flush the filter apparatus.

FIG. 2 illustrates another embodiment of the system using the filter apparatus 12. The supply hose 40 can supply fluid from the tank 32 to provide a burst of fluid into the interior of the filter apparatus 12. A tee valve 47 in an output line 49 leading from the tank 32 can direct fluid back to the filter apparatus 12. A solenoid valve 51 is located in the supply hose 40 between tee valve 47 and the filter apparatus 12. The solenoid valve 51 can be controlled to provide flushing fluid flow to the apparatus at desired intervals. Additionally, the solenoid valve 51 can have a manual operator thereon to allow manual operation of the valve or the supply hose 40 can have a bypass (not shown) with a manual valve bypassing the solenoid valve 51 allowing an operator to control the flushing intervals.

Figure 3:
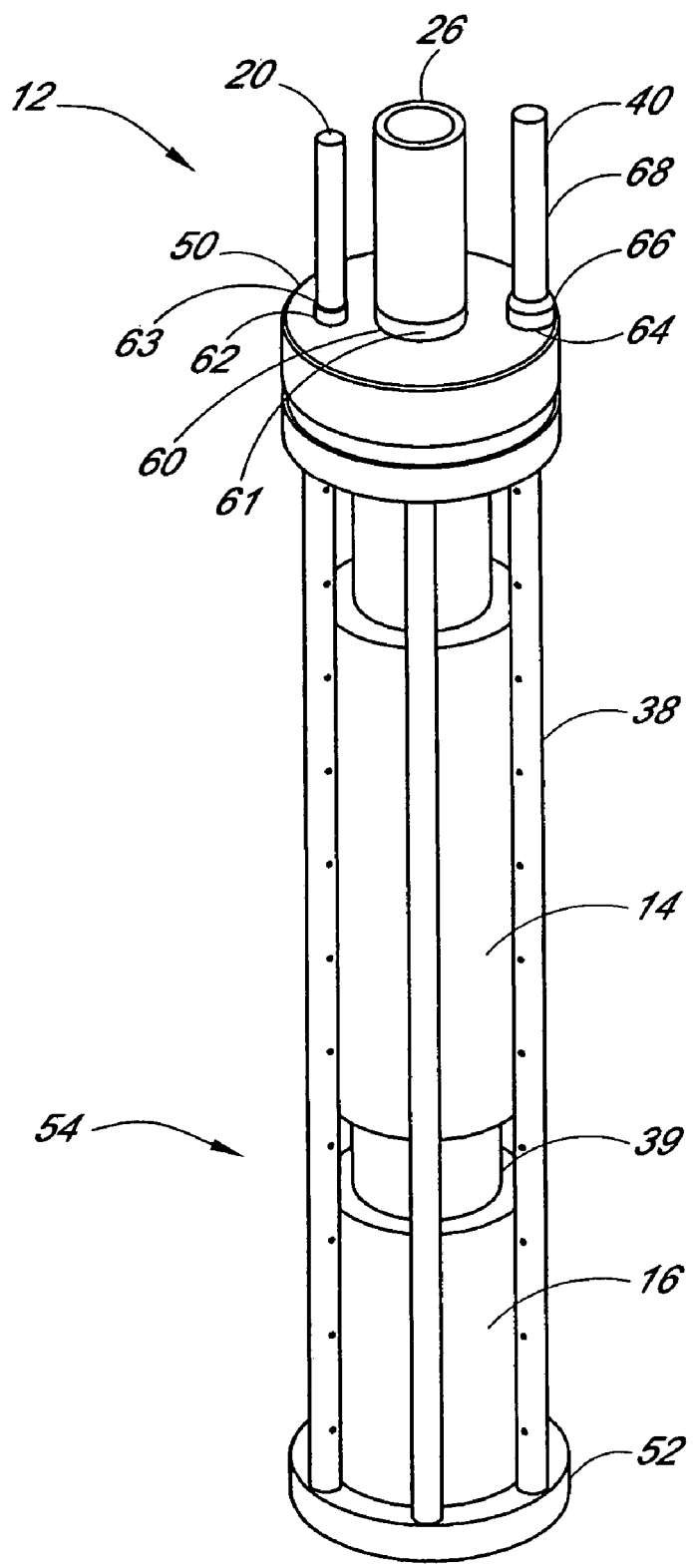
FIG. 3 is a perspective view of the filter apparatus of FIG. 1.

FIG. 3 illustrates one embodiment of the filter apparatus 12, shown without the filter sock 34, for clarity. The filter apparatus 12 has several hollow tubes 38 extending between a circular top manifold 50 and a circular bottom plate 52. In one embodiment, the tubes 38, the top manifold 50 and bottom plate 52 are made of polyvinyl chloride. However, other suitable materials such as fiberglass, metal and plastics can be used. In one embodiment, the tubes 38 are heat fused to the top manifold 50. Alternately, the tubes 38 are glued, threaded, welded or are otherwise fastened to the top manifold 50. The bottom plate 52 is heat fused to the tubes 38. Alternately, the bottom plate 52 is welded, glued or removably attached to the tubes 38 using fasteners. In the embodiment illustrated in FIG. 3, the filter apparatus 12 has six tubes 38 substantially evenly spaced around the outer circumference of the top manifold 50 and the bottom plate 52 to form a substantially cylindrical filter basket 54. Alternately, more or fewer tubes 38 can be used. The top manifold 50 and bottom plate 52 have a diameter large enough so that the submersible pump 14 and motor 16 will fit in the cavity 56 formed by the filter basket 54. One skilled in the art will appreciate that various sizes of filter baskets 54 can be manufactured to house different sizes and shapes of the pump 14 and motor 16 that will be received therein. For example, filter baskets 54 can be manufactured with internal diameters of, for example, 4 inches, 6 inches, 8 inches, 10 inches and 12 inches. Different numbers of tubes 38 can be used as desired, taking into account such factors as the size of pump 14 to be used inside the filter apparatus 12 and the pressure differential across the filter sock 34. For example, more tubes 38, such as 8 to 12, can be used in larger filter baskets 54 associated with larger pumps.

The top manifold 50 has a first hole 60 therein through which the pump discharge line 26 passes. A seal 61 extends around the pump discharge line 26 so as to fill any space between the line 26 and the periphery of the first hole 60. The top manifold 50 has a second hole 62 therein through which the electrical supply line 20 passes. A seal 63 is installed around the electrical supply line 20 so as to fill any empty space between the line 20 and the periphery of the second hole 62. The top manifold 50 also has a third opening 64 in a top surface thereof with an adapter 66 located within the opening 64 to receive a first end 68 of the air supply hose 40. The adapter 66 can be a threaded brass fitting for attaching the air supply hose 40 to the top manifold 50. The adapter 66 can also be made from other materials, such as plastic, metal and the like.

Figure 4:
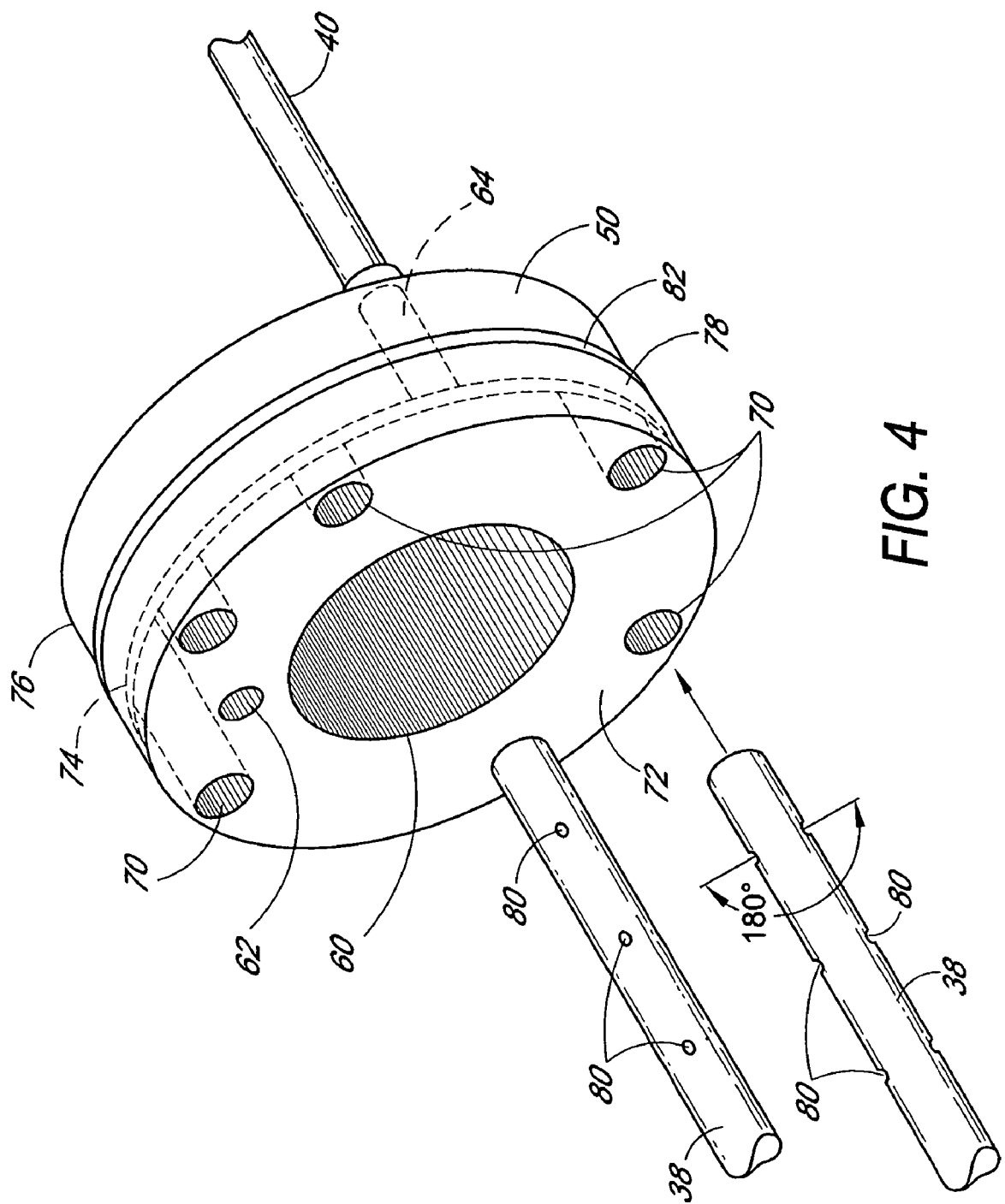
FIG. 4 is a perspective view of a manifold of the filter apparatus of FIG. 1, illustrating the openings and internal chamber in the manifold.

In FIG. 4 it is seen that the top manifold 50 has six tube apertures 70 located in the lower side 72 thereof. These apertures are each configured to receive a corresponding hollow tube 38. An internal concentric chamber 74 is located in the top manifold 50 to fluidly connect the third opening 64, to which the air supply hose 40 is attached, with the tube apertures 70 such that pressurized air from the air supply hose 40 passes into the hollow tubes 38. In one embodiment, the top manifold 50 can be made by aligning an upper plate 76 and a lower plate 78 to place corresponding grooves (not shown) on each plate in proper alignment, and then heat fusing, gluing, welding or bolting the plates 76 and 78 together so as to form the internal chamber 74. Of course any other method of making the manifold 50 can be used.

Each tube 38 contains a number of perforations or jets 80 therein. When pressurized air is inserted into the tubes 38, the air escapes out the perforations 80. In one embodiment, the perforations 80 are arranged in two rows spaced about 180 degrees apart around the tube 38 to direct the burst of air along the inner surface of the filter sock 34. Alternatively, the rows of perforations 80 can be placed at angles less than 180 degrees apart to direct the air blasts more directly against the filter sock 34. The perforations 80 are longitudinally spaced along the hollow tubes 38 to provide air bursts along substantially the entire length of the hollow tubes 38. In one embodiment, the perforations 80 are spaced approximately every three inches along the tube 38 of about three inches between perforations, however, other spacing can be used.

The filter sock 34 (See FIG. 1) is shaped like a tube sock. The diameter of the filter sock 34 is such that it may be snugly slid over the filter basket 54 formed by the tubes 38. The length of the filter sock 34 is at least long enough to cover the tubes 38. The upper perimeter of the filter sock 34 preferably is sealed in a groove 82 in the perimeter of the manifold 50 by a suitable, easily removable tape, band, strap or any other retainer to prevent particles from gaining access to the interior of the filter basket 54 through an open end of the filter sock 34. In an embodiment where the filter element is a tube or the like, a lower perimeter of the filter element can be sealed in a similar manner.

The filter apparatus 12 (FIG. 1) is installed around the pump 14 and motor 16 by removing the bottom plate 52 and sliding the pump and motor into the filter basket 54. The pump discharge line 26 is fed through the first hole 60 in the manifold. The electrical supply line 20 is fed through the second hole 62 in the manifold 50. The air supply hose 40 is attached to the adapter 66 on the manifold 50. The seals 61 and 63 are then installed on the electrical supply line 20 and pump discharge line 26. The bottom plate 52 is then attached to the tubes 38 and the filter sock 34 is slid over the filter basket 54. In another embodiment, the bottom plate 52 can be a ring with an opening therein. In this embodiment, the bottom ring 52 can be permanently attached to the tubes as described above. The pump 14 is inserted into the filter basket 54 through the opening. A seal on the bottom ring 52 conforms to an outer surface of the pump 14. The seal can be an o-ring or a flashing capable of creating a seal with various sizes of pumps.

In operation, the filter apparatus 12 containing the pump 14 and motor 16 is lowered into a fluid containing particulate material that is to be pumped. The fluid is sucked through the filter sock 34 that is stretched around the filter basket 54 which removes the particulate matter. The fluid then passes into the confines of the filter basket 54 and then into the fluid inlet of the pump 14. Particulate material removed from the fluid is collected on the outer surface of the filter sock 34. The outer surface of the filter sock 34 must be periodically flushed. To flush the filter sock 34, air, gas, or cleaning fluid is directed down the air supply hose 40 and into the internal chamber 74 of the top manifold 50. The air, gas, or cleaning fluid is then distributed in the chamber 74 to each of the hollow tubes 38. The air, gas, or cleaning fluid then escapes out of the hollow tubes 38 through the perforations 80 and is directed against the inner surface of the filter sock 34. The flow of air, gas, or cleaning fluid in the reverse direction removes the particulate material that has collected on the outer surface of the filter sock 34.

In another embodiment, the filter apparatus 12 can be placed on the end of a pump suction line that is lowered into the fluid to be pumped. In this embodiment, the design of the filter basket 54 is substantially the same, except that no electrical supply line passes through the manifold and the pump suction line passes through the manifold instead of the pump discharge line.

In another embodiment for use in pumping from fluid supplies containing flammable fluids, the filter basket and the supply hose can be made from flame and heat resistant materials. If a fire were to break out in the fluid supply, the system can be used to deliver an extinguishing agent, such as carbon dioxide.

Figure 4A:
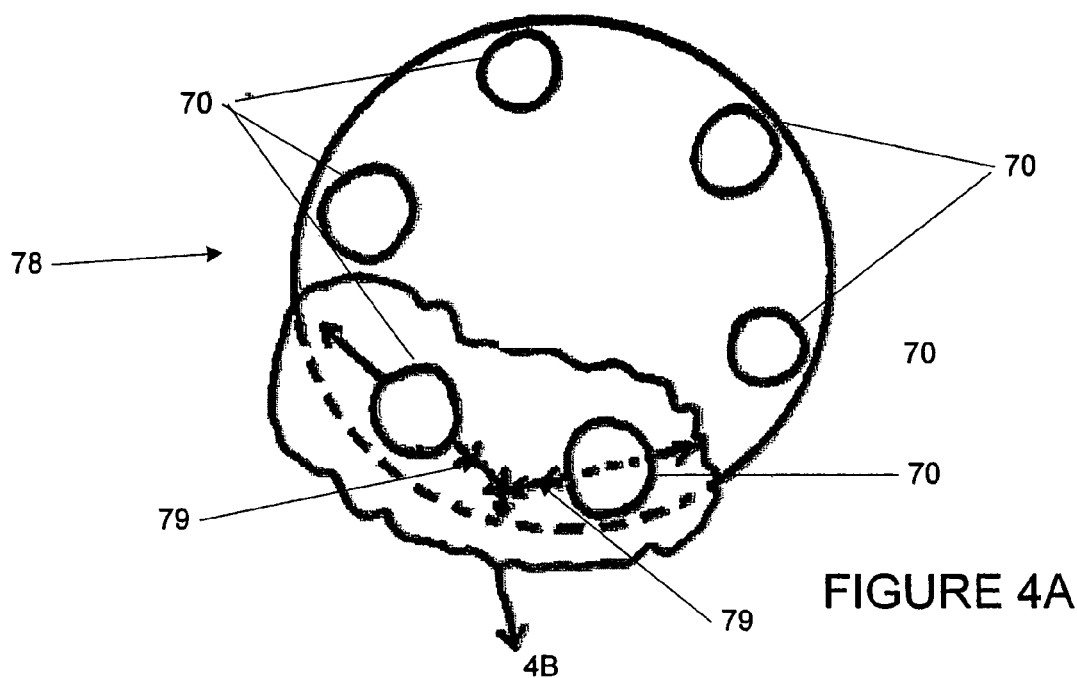
FIG. 4A is a top cross section view taken along lines 4A-4A of FIG. 4 which illustrates the operation of the filter apparatus depicted in FIG. 4.
Figure 4B:
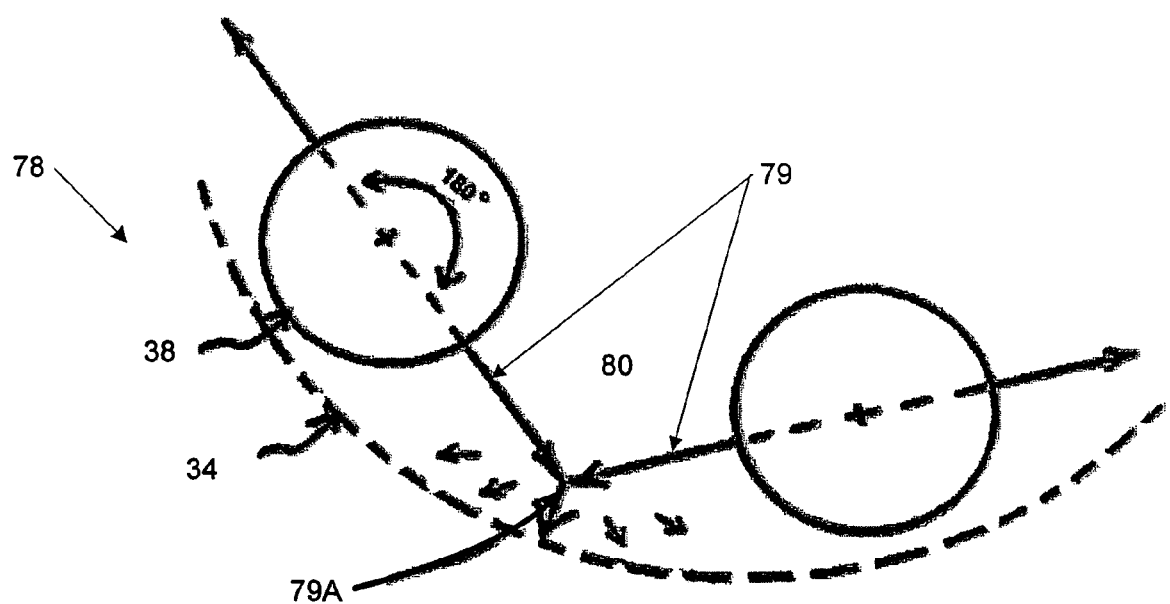
FIG. 4B depicts a close up, cutaway view of a region designated as "4B" in FIG. 4A.

FIG. 4A depicts a horizontal cross section view of the lower plate 78 showing the positions of a set of apertures 70 which are fluidly connected to each tube 38. Lines 79 indicate both the positions of perforations 80 on each tube 38 and the direction of the sprays of fluid flowing from each perforation 80. As in FIG. 4B which depicts a cutaway view depicting the tubes 38 below the apertures 70, tubes 38 have lines of perforations 80 extending in directions that are about 180 degrees from each other. When back flushing, adjacent sprays from perforations 80 on adjacent tubes 38 meet and impinge on each other, creating an agitation effect, which produces a combined spray in the direction indicated by arrow 79A, which is generally perpendicular to the inside of the filter sock 34. This interaction advantageously increases the surface area that is cleaned during backflushing.

Figure 4C:
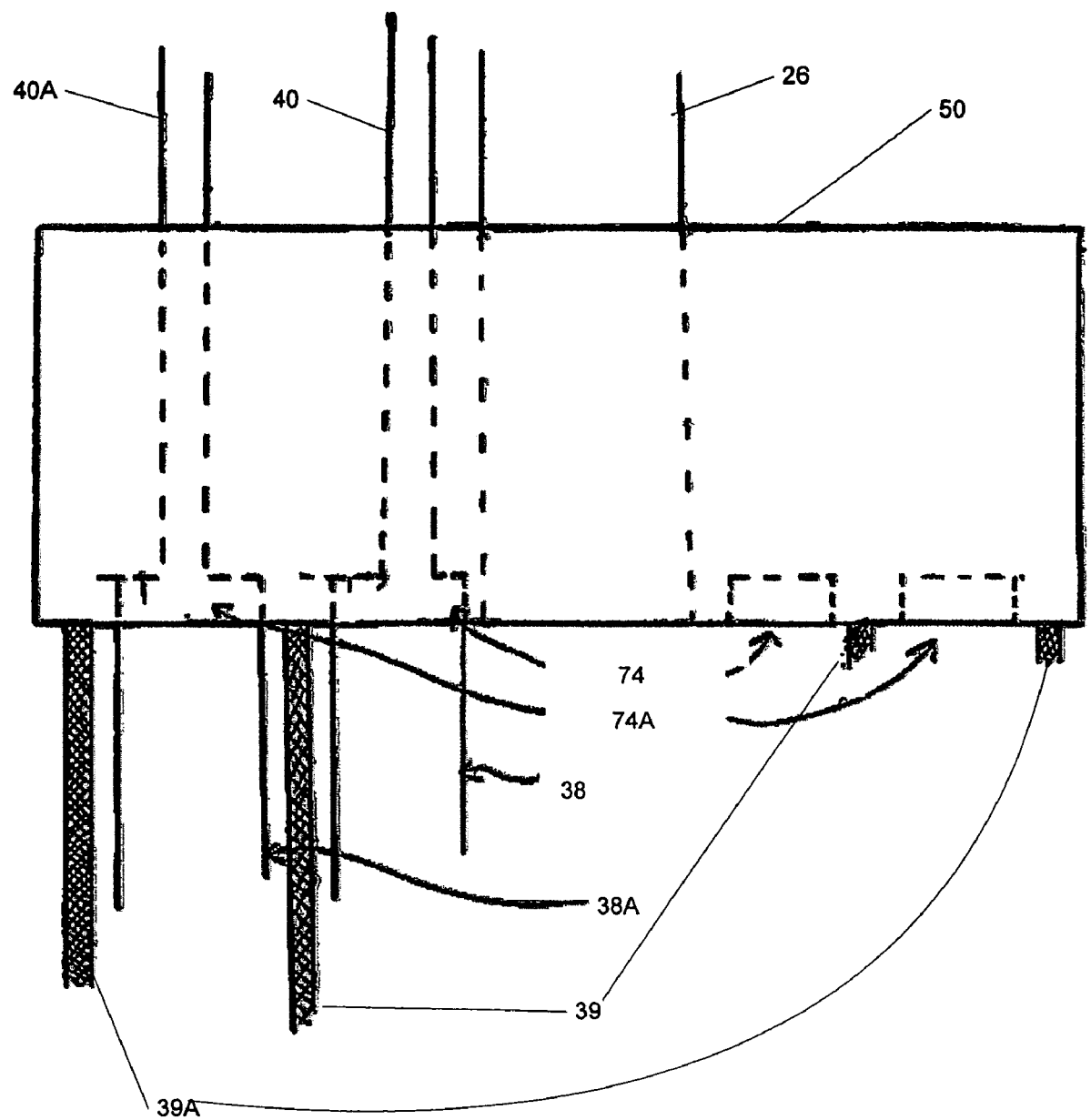
FIG. 4C depicts a side view of another embodiment of a manifold of a filter apparatus of FIG. 1 similar to that of FIG. 4.

FIG. 4C depicts a side view of a dual chamber embodiment of a manifold 50. The first chamber 74, fed by supply line 40, may be configured to provide a flushing medium to the perforations 80 in the tubes 38 for backflushing the filter element 39. A second chamber 74A, fed by a second supply line 40A, may be configured to provide a second medium through a second set of perforations (not shown) on each of a second set of tubes 38A. In one embodiment, the second set of tubes 38A is configured to backflush a second, filter 39A. This second supply line 40 may also provide a flow of chemical additives and or gases to the filtration area using the tubes 38a to enhance operation of the device. In one embodiment, these supply lines 40 may be configured to deliver an enhancing material comprising a flocculent. In other embodiment this enhancing material may comprise a coagulant such as, for example, iron particles. In yet another embodiment, the enhancing material may comprise a viscosity reducing agent such as, for example, steam. Some embodiments, such as, for example, those where the second set of tubes is configured to deliver enhancing agents, may not include a second filter 39A. It is to be appreciated that embodiments of manifold 50 may comprise additional chambers coupled to additional sets of tubes to provide, for example, additional layers of filtering.

Figure 5:
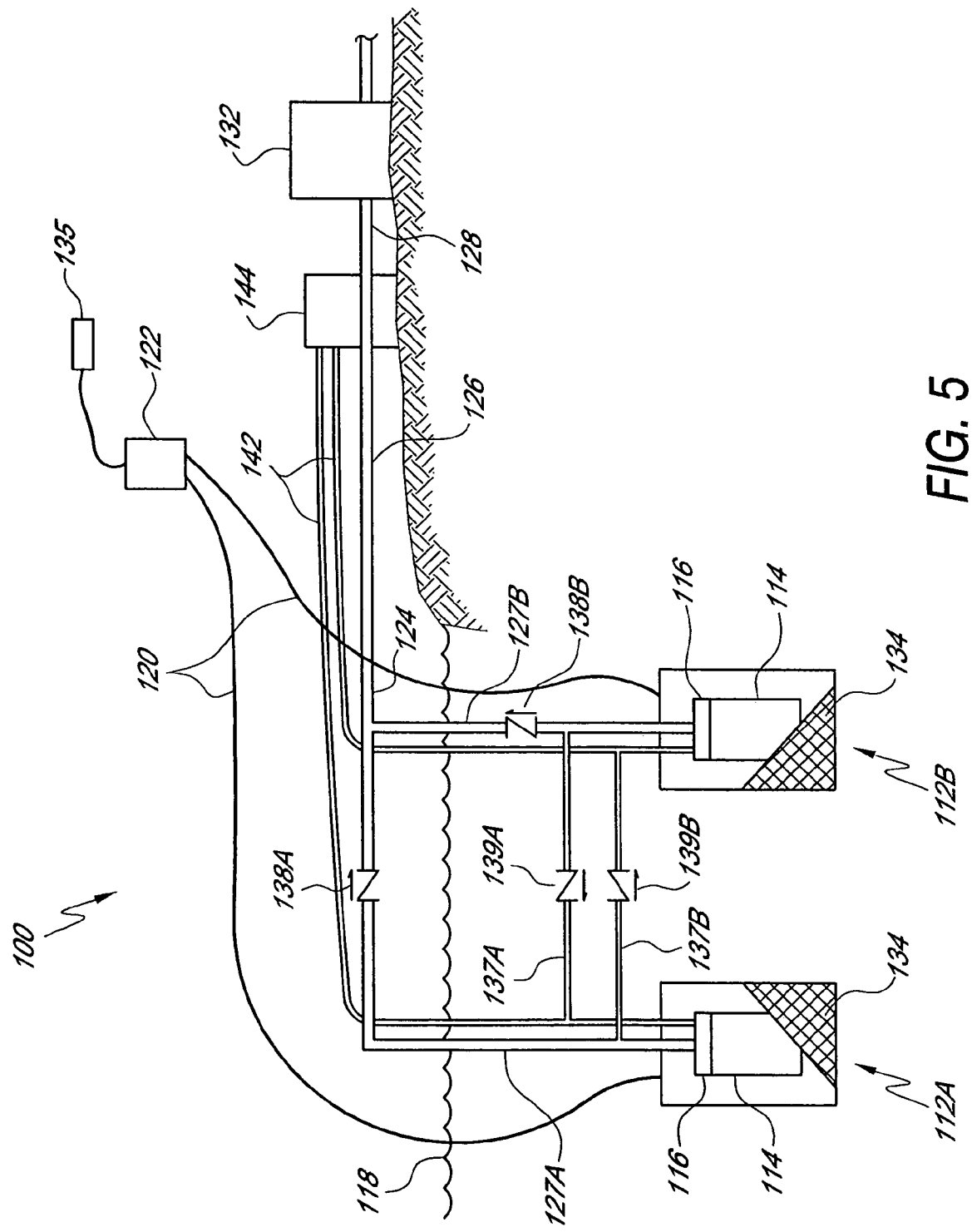
FIG. 5 is a schematic diagram of another embodiment of a system for pumping fluid using multiple self-cleaning filters according to one aspect of the invention.

Referring now to FIG. 5, a system 100 for pumping fluid from a well or fluid source using multiple self cleaning filters 112 is shown. FIG. 5, for example, illustrates an embodiment of the system 100 with two self-cleaning filters 112A and 112B. However, more filters 112, such as three, four, or more can be used in the system 100. In the embodiment illustrated, each filter apparatus 112A and 112B encloses a submersible pump 114 in combination with an electric motor 116, however less or more pumps 114 can be used in the system 100. Each submersible pump 114 and its associated electric motor 116 are preferably contained in a common housing and can be of conventional design. In one embodiment, the filters 112A and 112B and pumps 114 are lowered into a fluid source 118. An electrical supply line 120 connects an appropriate electrical power source 122 to the electric motors 116.

A first end 124 of a main discharge line 126 separates into two pump discharge branches 127A and 127B. The pump discharge branches 127A and 127B connect to the submersible pumps 114 in the filters 112A and 112B, respectively. In embodiments with more than two filters 112A,B, the main discharge line 126 will branch into multiple pump discharge branches so that each filter is connected to the main discharge line. A second end 128 of the pump discharge line 126 is attached to a typical fluid tank 132 used for storing the pumped fluid. In operation, each filter apparatus 112A,B substantially prevents the material to be removed by the filter, such as particles, salt, ions or other material that is desired to be filtered, from entering the submersible pump 114. Although this embodiment illustrates the filters 112A and 112B being used with a system 100 to pump and filter water from a fluid supply, such as a pond, one skilled in the art will understand that the filters 112A and 112B can be used to filter other liquids, such as sea water, brackish water, salt water, oil, gas, sewage, chemicals, industrial waste, and can be used to pump liquids from ponds, streams, dewatering projects or other sources to any desired collection location. In one embodiment, the filters 112A,B are placed at a depth below the surface of the fluid 118 to be filtered such that the pressure of the fluid forces the fluid through the filter 112A,B.

Each filter apparatus 112A and 112B has a filter element 134 (partially removed for clarity purposes) to screen out unwanted dissolved or suspended particles and colloids, ions, microorganisms, pyrogens and viruses, other dissolved organics and inorganics, or abrasive materials such as sand and the like. In one embodiment, the filter element 134 comprises a filter sock made of a synthetic fabric with 10-micron openings. In other embodiments, the filter element 134 can comprise a membrane suitable for particle filtration, microfiltration, ultrafiltration, nanofiltration or reverse osmosis. Any other filter elements 134 and/or filtration media with different sized openings designed to filter impurities can also be used. For example, the filter element 134 can be a tube or filter material wrapped around the filter apparatus 112A,B. During the filtering operation, some of the matter that the filter element 134 screens out collects on the outside of the filter element 134. The quantity of matter collected on or in the filter element 134 affects the pressure drop across the filter element 134. Since an, excessive pressure drop across the filter element 134 can significantly reduce fluid flow and thereby adversely impact the performance of the pump 114, or damage the filter element 134, the filter element 134 must be periodically changed or appropriately back washed or flushed to clean the accumulated particulate material therefrom.

In one embodiment, an electric control box 135 programs the pumps 114 to pump in alternate pumping cycles. For example, as the pump 114 is pumping the filtered fluid through filter 112A and the branch pump discharge 127A to the supply tank 132, a portion of the pumped fluid is directed through a first cross connect line 137A to back flush or clean the other filter 112B. Branch line check valves 138A and 138B direct the flow in the desired direction in the pump discharge branch lines 127A and 127B. A second cross connect line 137B is used when the other pump 114 is operating to back flush or clean the filter 112A. Cross-connect check valves 139A and 139B direct the flow of fluid through the cross connect lines 137A and 137B in the proper direction. The system 100 can automatically alternate pumps 114 through the electric control lines 120 and the control box 135. With multiple pumps 114, continuous fluid discharge can be provided to the tank 132 as desired or required, and a flushing fluid can simultaneously back flush and clean the filter elements 139 of a non-operating filter 112A,B.

In one embodiment, the pumps 114 are not located in the filter assemblies 112A,B but instead are located above the surface of the fluid 118 to be pumped, as described above. In this embodiment, the lines 127A,B are non-collapsible pump suction lines 127A,B that extend down into the filter assemblies 112A,B and provide the suction. In this case, the pumps may be in the discharge tank 132 or outside of it. The flow of cleaning fluid through cross-connect lines 137A,B can still be controlled by cross-connect check valves 139A, B. In many embodiments utilizing control of cross-connected flushing flow, the cross-connect check valves 139A,B will be remotely operated stop-check valves capable of stopping, starting and throttling flow, but only in one direction. Additionally, in many of the embodiments described herein, discharge valves 138A,B will be remotely operated stop-check valves as well.

In one embodiment, cleaning additive supply lines 142 can also connect to the filters 112A and 112B. An injection system (not shown) connected to a cleaning supply tank 144 filled with a cleaning fluid can be used to supply additional cleaning solutions or gasses to clean and/or disinfect the filters 112A,B.

In one embodiment, such back-washing is accomplished by directing bursts of a flushing fluid to the interior of the filter apparatus 112A,B and spraying this fluid forcefully in an outwardly direction against interior surfaces of the filter element 134 as explained above. The filter element 134 also can be wrapped with an outer layer made from a metal or plastic mesh-like material or perforated sheet material as described above to add mechanical strength to the filter element 134 and provide filtering as well. In some embodiments, another manifold (not shown) with either an additional or a separate supply line (not shown) and a set of additional tubes (not shown) on the outside of filter element 134 may be added to the filter assembly 112A,B. The addition of such an additional portion of a system will allow fluid being filtered to also be disinfected by injecting cleaning solution or gas through the additional supply line, into the additional manifold, into the additional outside tubes and out of the orifices therein thus mixing with the fluid to be filtered that is being forced through the filter fabric. This will assist these embodiments in preventing unwanted organisms from growing on the filter element 134. Then, after such filtering and disinfecting/treatment, this fluid may be ready for its desired use. By mixing a cleaning solution and or gas with the fluid being filtered prior to filtration, the accumulated filtered material on the fabric will be much easier to backwash. This additional set of tubes will also help protect and hold the filter element 134 in place, especially when high pressures or velocities are required to back flush the fabric.

Still referring to FIG. 5, certain embodiments of the filter assembly 112 are used in existing mechanical systems as well. Rather than mounting the system 100 above the surface of a fluid 118 to be filtered, the filter apparatus can be inserted into a tank (not shown) or other pressure vessel (not shown) wherein a pressure differential can be established across the filter element 134 to provide a motive force for driving the fluid through the filter element. Some embodiments of the filter assembly 112 are utilized in oil systems where impurities exist in suspension or otherwise and must be removed to improve the lubricating characteristics of the oil. In these embodiments, the filter assembly 112 can be placed in an area downstream of the oil pump, wherein the pump supplies the differential pressure across the filter element 134. In many embodiments, the filter assembly 112 will be placed in a part of the system where a drain plug or automatic drain valve (not shown) can periodically be used to drain sediment collecting in the vicinity of the outside of the filter element 134. Such embodiments will use any of the other variations described herein to accomplish the purpose of the system, namely recirculating fluid to flush the sediment from the outside surface of the filter element 134. Some such embodiments will allow a portion of the filtered oil to recirculate as the flushing fluid as described elsewhere herein. One such oil system 100 could be a car oil, transmission or fuel system where the filter assembly 112 is installed as an additional filtration system 100 designed to operate as a replacement for, in series or in parallel with the existing replaceable fluid system filters. However, the system 100 can be used in ships, trains, large equipment or any other machinery lubrication system. The filtration material used in such systems 100 may be any material suitable for filtration in the particular application.

Alternatively, some embodiments of the system 100 will be used in other filtration systems requiring the filtration of sediment or other particles. One such system is a wastewater treatment system. In such systems, the filter assembly 112 filters impurities from the fluid while allowing the flushing fluid to periodically remove the sediment settling out from the outer surface of the filter element 134. Again, the filter assembly 134 can be in a tank, a pressure vessel, a pipe or a special enclosure wherein a differential pressure across the surface of the filter element 134 causes flow of the fluid through the filter element 134. In these systems, any of the filter materials described elsewhere herein can be used. For instance, in some embodiments filtration mesh may be used to remove large or bulk substances from the fluid for rapid remediation of highly contaminated water, or the system 100 can be used in the final filtration process to remove microbes, volatile organic compounds, or other particulate or dissolved impurities.

In another embodiment, the system 100 is used in applications that utilize the pressure created by a fluid height to produce the differential pressure needed to overcome the resistance of the filter element 134. One such application is a hilltop or mountain source or reservoir. A pipe or other fluid conducting system capable of withstanding relatively high pressures as needed or required, such as culverts, can be used to conduct the fluid from a height at which it is stored, down to the system 100 where it is to be filtered. The fluid height leading from the elevated source down to the system 100 and the filtered water level will develop a pressure if the water is contained. This pressure is applied to the outside surface of the element in these embodiments to create flow of the fluid through the filter assembly 112 and out of the assembly. This filter system 100 is self-cleaning and requires no external power to create the filtered water, although the filtered water may need to be transported elsewhere thereby utilizing power. The height required to create sufficient pressure across the filter element 134 will depend upon the type of filter element 134 utilized. The greater the flow resistance created by the filter element 134, the larger the fluid height will have to be. As described elsewhere herein, either some of the filtered fluid will be recirculated for flushing the filter assembly 112, or a separate flushing line 142 will be utilized to flush the filter assembly 112.

Other embodiments utilize other natural sources of pressure to cause flow through the filter element 134. These sources can be geothermal or any other source of natural pressure. One embodiment utilizes the natural pressure of oil wells to remove undesired impurities, dissolved or particulate, from the oil removed from the wells, thereby conserving the energy needed to perform this filtration after the oil has been removed from the ground. The pressure of the oil leaving the well will provide motive force to drive the flushing fluid, some of the filtered oil in this case, through the filter assembly 112 to backflush the filter element 134. Another embodiment uses the geothermal pressure of water in aquifers and other underground sources. The pressure created by the heating of the water provides the pressure necessary to cause flow in these systems 100 through the filter element 134. Again, the type of filter element 134 will determine the amount of pressure needed, therefore, not all geothermal sources will be able to provide enough pressure for some of the high differential pressure filter materials. Water filtered in these systems 100 can be disinfected as described above as well as filtered to provide the desired quality of output water. These are just a few examples of embodiments of the invention contemplated herein, and any source of pressure can be used to create flow of a fluid to be filtered through the filter assembly 112. These systems can use external flushing systems such as those described above with respect to FIGS. 1 and 2 to provide the motive pressure for flushing the filter element 134, or any other system to provide such pressure. Additionally, any other mechanical devices and systems can be used from the hydraulic pressure of the fluid source to create the pressure in the flushing line. This is true whether that hydraulic pressure be from the fluid height of elevated fluid source, from the pressure of the pressurized oil well or geothermic well, or existing lubricating systems in machinery or cars. Such equipment may include, in some embodiments turbo-pumps powered by the hydraulic pressure of the fluid being filtered to pressurize the flushing line. It is intended that these embodiments can utilize such energy conversion to operate the filtration system 100 and apparatus 112 using as little external energy or electricity as possible.

Figure 6:
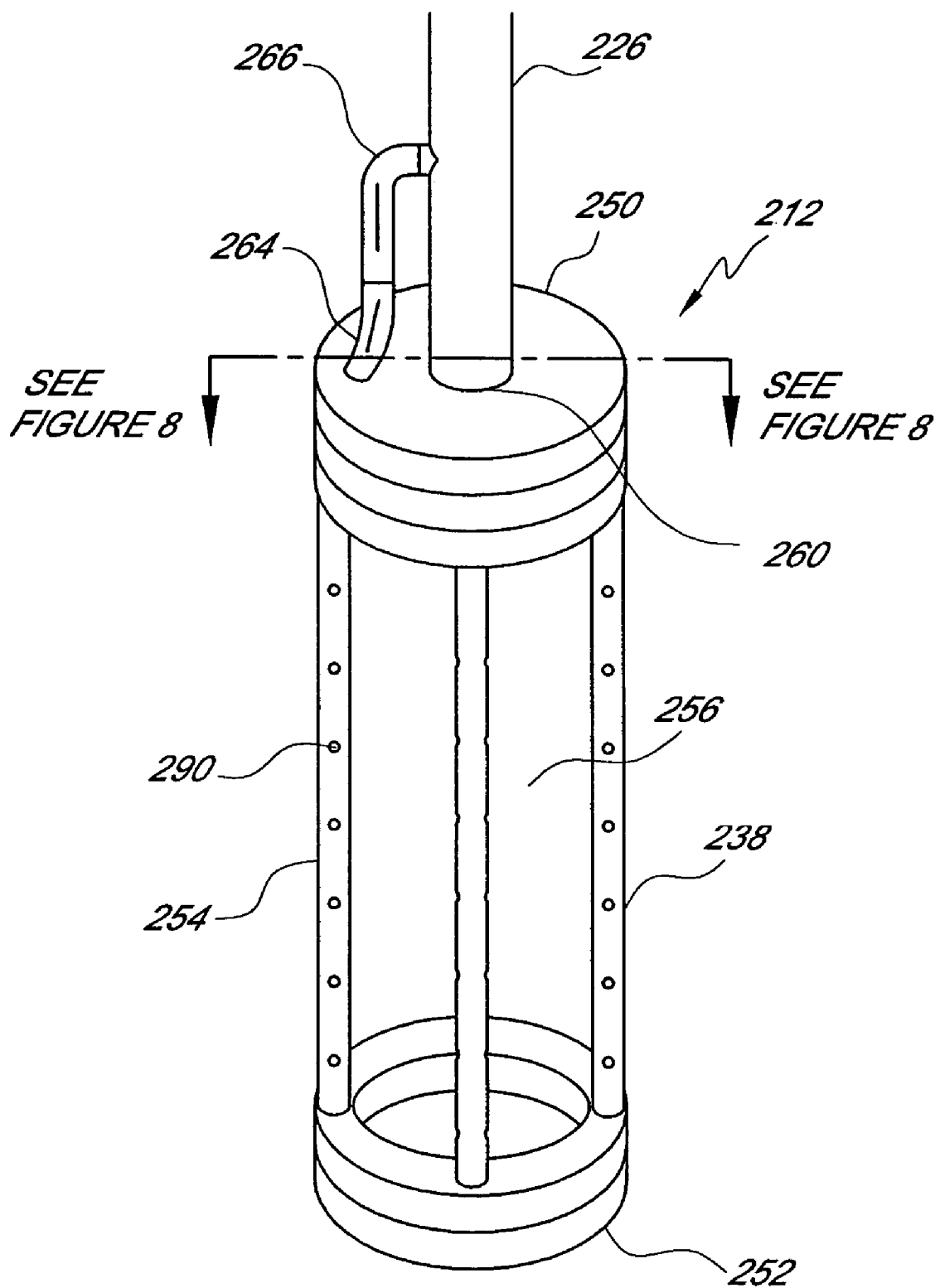
FIG. 6 is a perspective view of a filter apparatus according to one embodiment of the invention.

FIG. 6 illustrates an embodiment of a filter apparatus 212, shown without a filter element 139 for clarity, that is capable of directing a cleaning fluid flow against the filter element 139 during pump 114 operation. The filter apparatus 212 has several hollow tubes 238 extending between a circular top manifold 250 and a circular bottom plate 252. In one embodiment, the tubes 238, the top manifold 250 and bottom plate 252 form a filter basket 254 and are made of polyvinyl chloride. However, other suitable materials such as fiberglass or other composites, metals and plastics can be used. In some embodiments, the material used will depend on the application of the system 212. For instance, if a deep seawater application is desired, the material will be chosen such that it can withstand the hydraulic, corrosive and mechanical effects of such an application. Suitable materials for such an application might include, for example, stainless steel, titanium, inconel, or other alloys such as nickel-copper, or very strong plastics or composites. In one embodiment, the tubes 238 are heat fused to the top manifold 250. Alternately, the tubes 238 are glued, threaded, welded or fastened to the top manifold 250.

Still referring to FIG. 6, the bottom plate 252 is heat fused to the tubes 238. Alternately, the bottom plate 252 is welded, glued or removably attached to the tubes 238 using fasteners. In one embodiment, the filter apparatus 212 has six tubes 238 substantially evenly spaced around the outer circumference of the top manifold 250 and the bottom plate 252 to form a substantially cylindrical filter basket 254. Alternately, more or fewer tubes 238 can be used. Each of the tubes 238 has a number of orifices or perforations 290 running the length of the tube 238 for ejecting the fluid running through the tube 238. The perforations 290 can simply be holes in the side of the tube 238 or they can have varying shapes to create any number of velocity and spray pattern effects that the particular application may require. For instance, each perforation 290 may be larger on the inside of the tube 238 and get smaller toward the outside of the tube 238 to increase the velocity through the tube. In another embodiment, the perforations 290 are larger as they are farther away from the bottom plate 252 in order to evenly distribute the fluid along the length of the tubes 238. The perforations 290 are distributed in one or more rows in one embodiment, while in other embodiments, the perforations 290 are not linearly located with respect to one another. In some embodiments, the perforations 290 are located in rows that face radially outward from the center of the filter apparatus 212 towards the surface of the filter element (not shown), while in other embodiments, the rows of perforations 290 from each tube 238 are not directed directly radially outward from the center of the filter apparatus 212. In such embodiments, the fluid directed from the perforations 290 will interact from fluid directed from perforations 290 from an adjacent tube 238 while impinging the inner surface of the filter element (not shown).

The top manifold 250 and bottom plate 252 have a diameter large enough so that a submersible pump (not shown) and a motor (not shown) will fit in a cavity 256 formed by the filter basket 254. One skilled in the art will appreciate that various sizes of filter baskets 254 can be manufactured to house different sizes and shapes of the pump and motor that will be received therein. For example, filter baskets 254 can be manufactured with internal diameters of, for example, 4 inches, 6 inches, 8 inches, 10 inches and 12 inches, but they may be larger or smaller as well. Different numbers of tubes 238 can be used as desired, taking into account such factors as the size of pump to be used inside the filter apparatus 212 and the pressure differential across the filter sock 134. For example, more tubes 238, such as 8 to 12, can be used in larger filter baskets 254 associated with larger pumps.

The top manifold 250 has a first hole 260 therein through which a pump discharge line 226 passes. A seal (not shown) extends around the pump discharge line 226 so as to fill any space between the line 226 and the periphery of the first hole 260 as described above. The top manifold 250 has additional holes therein (not shown) through which the electrical supply line passes as described above. The top manifold 250 also has a third opening 264 in a top surface thereof with an adapter to receive a flushing fluid line 266. Preferably, the flushing fluid line 266 is connected to the discharge line 226 such that a portion of the fluid being pumped is returned to the filter 212 as a flushing fluid. However, the flushing line 266 can also include a valve (not shown) to control flow through it and can also be connected to an external cross-flow flushing system as described above. As can be seen, in this embodiment, the pump within the filter apparatus 212 supplies the force to pressurize the flushing fluid to clean the filter apparatus 212. In some embodiments, a tee joint (not shown) will be used instead of a 90-degree bend from pump discharge line 226 for flushing fluid supply line 266, and check valve (not shown) is placed in line 266 so that a cleaning solution/fluid can be incorporated in the back flushing and treatment of fluid being filtered. In some embodiments using a suction line and no pump (not shown) in the filter assembly 212, flushing fluid line 266 can be connected to a pressurized line (not shown) to supply flushing/cleaning fluid to the filter apparatus 212. Such tee joints can be especially useful for adding flushing lines 266 to those systems 100 described above that are added to already existing systems, such as car oil systems, transmission fluid systems, geothermal water filtration systems, pressurized oil well filtration systems, or any other systems utilizing backflushing not directly provided from the filtration apparatus 212 itself.

In one embodiment, the bottom plate 252 can be a ring covered by the filter medium such that some fluid flow can pass into the filter basket 254 through the bottom plate 252. In one embodiment, the filter basket extends past the motor to allow sufficient area of filter material so that there is a cooling flow past the motor. Additionally, the filter basket 254 can be constructed so that the manifold 250 only covers a portion of the top of the filter basket such that the remaining portion of the top of the filter basket is covered with filter material so that this area can be used to filter incoming fluid.

Figure 7:
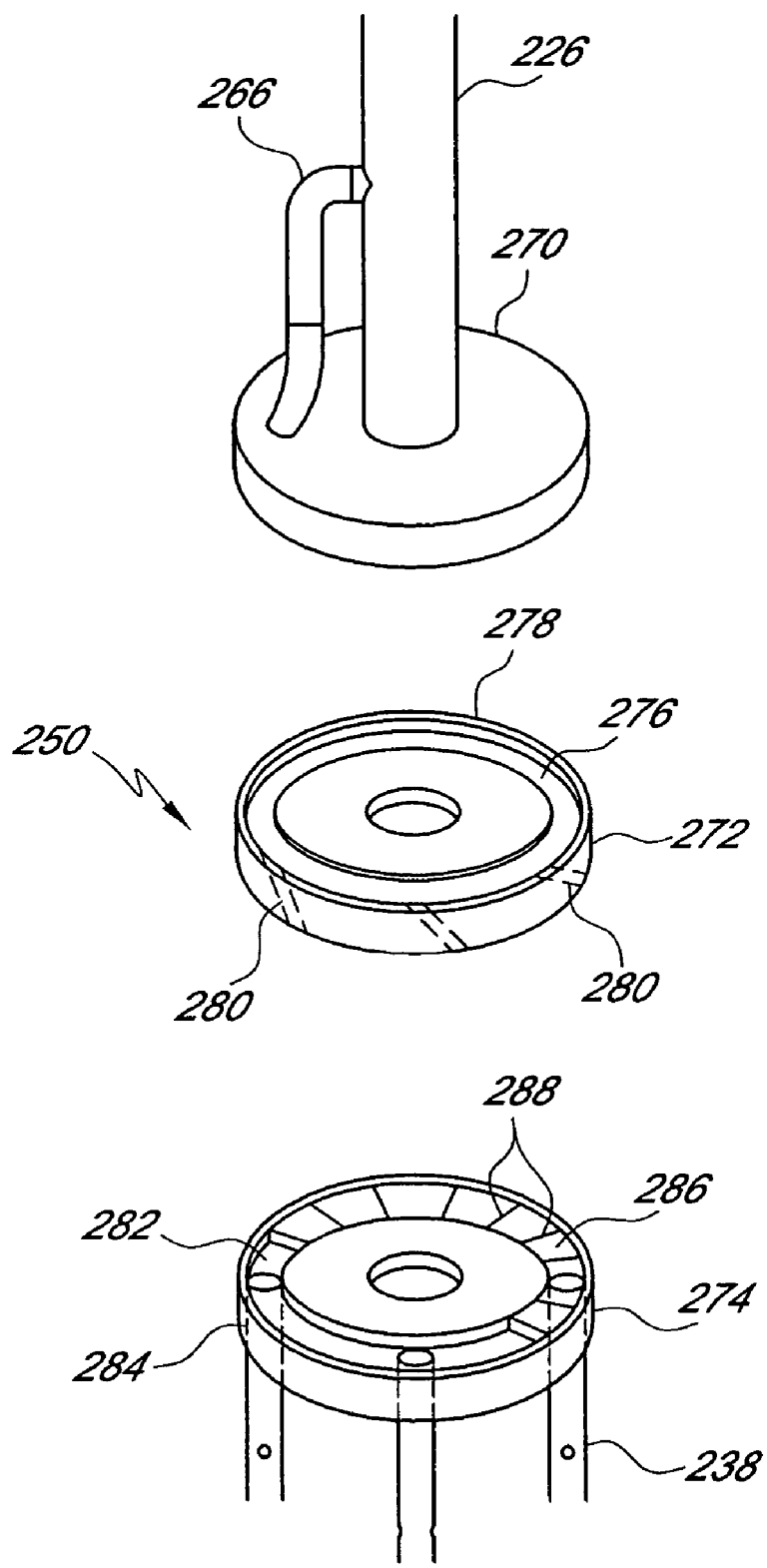
FIG. 7 is an exploded view of a manifold of a filter apparatus of FIG. 6.
Figure 8:
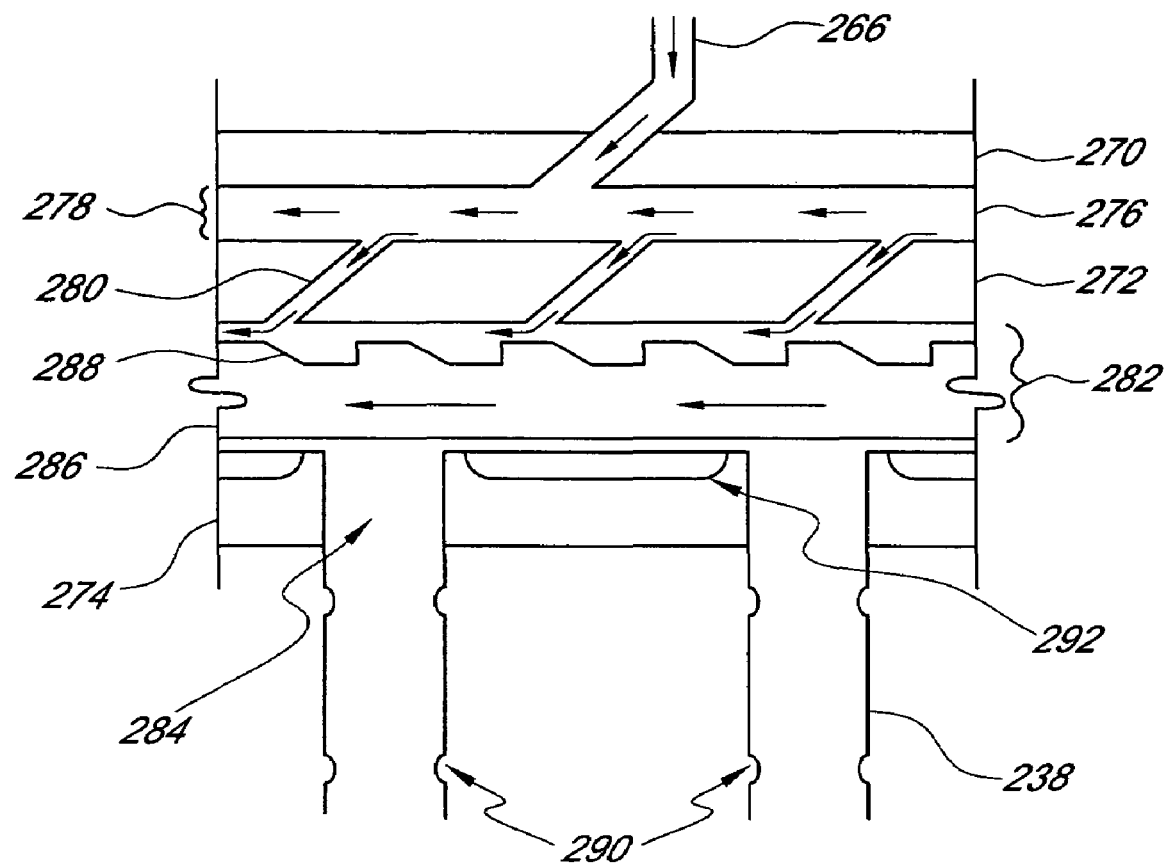
FIG. 8 is a cross sectional view of a manifold portion of the filter apparatus of FIG. 6, taken along line 8-8 of FIG. 6.

FIG. 7 is an exploded view of the manifold 250 and illustrates that in some embodiments the manifold 250 has a top plate 270, a middle plate 272, and a bottom plate 274. FIG. 8 is a cross-sectional view of the manifold 250. FIGS. 7 and 8 illustrate that the middle plate 272 has a first slot chamber 276 formed in an upper portion 278 thereof. The first slot chamber 276 is configured to receive a flow flushing fluid from the flushing fluid line 266. In one embodiment, the flushing fluid line 266 passes through the top plate 270 at an angle so that the flushing fluid flows in either a clockwise or counterclockwise motion in the slot chamber 276. The middle plate 272 has at least one opening 280 extending through the middle plate 272. In some embodiments, the middle plate 272 has several openings 280 with at least one, in some embodiments, associated with each one of the tubes 238. In one embodiment, the openings are spaced substantially equidistant from one another around the middle plate 272.

The bottom plate 274 has a second slot chamber 282 formed in an upper portion thereof. The bottom plate 274 has a number of tube apertures 284 located in the lower side thereof connecting the second slot chamber 282 with the tubes 238. These apertures 284 are each configured to receive the corresponding hollow tube 238 as described above. Each tube 238 contains a number of perforations 290 or jets therein. When a pressurized flushing fluid is introduced into the tubes 238, the flushing fluid escapes out the perforations 290 and is directed against the filter element (not shown). The flushing fluid is of sufficient pressure so that as the flushing fluid is directed against the inside wall of the filter element, it overcomes the inward force caused by the pump intake (not shown) and the pressure of the of fluid to be filtered so that, at least in an area adjacent to the perforation 290, there is a net flow of fluid from the interior of the filter element to the exterior of the filter element, thereby removing particles entrapped on or in the filter element and cleaning the filter element.

In some embodiments, the openings 280 extend through the middle plate 272 at an angle or are otherwise designed to increase the velocity of the fluid. In some embodiments, the openings 280 extend through the middle plate 272 at an angle between 20 and 60 degrees, although any design to generate angular velocity in the fluid passing through the openings 280 can be used. The various design choices, such as angles and shapes, for various embodiments will utilize the pressure-velocity relationships of the fluid in these confined spaces to accelerate the fluid flowing through the openings 280. The flushing fluid flowing in a circular motion in the first slot chamber 276 enters the openings 280 and is projected through the middle plate 272 and into the second slot chamber 282 in the bottom plate 274. The pressurized fluid flowing at an angle causes a circular fluid flow in the second slot chamber 282 in the bottom plate 274.

An arcuate blocking piece 286 is positioned in the second slot chamber 282. The blocking piece is shaped so that it fits in the second slot chamber and is free to rotate around the bottom plate 274 in the second slot chamber 282. During operation, the blocking piece 286 is pushed in a circular motion around the bottom plate 284 by the pressurized flushing fluid flow. As the blocking piece 286 moves around the second slot chamber 282, it periodically covers one or more of the apertures 284 leading to the tubes 238. Accordingly, when the blocking piece 286 is covering an aperture 284 leading to a particular tube 238, flushing fluid is prevented from entering the tube 238, or is otherwise restricted.

The blocking piece 286 can be designed to simultaneously cover and uncover as many apertures 284 as desired. In some embodiments, only one aperture 284 is uncovered at any one time, while in other embodiments multiple or many apertures 284 can be uncovered. During the times when little or no flushing fluid is entering the tube 238, fluid to be filtered and pumped can freely pass through the filter element. In some embodiments, the blocking piece 286 has a number of vanes 288 on an upper surface thereof. The fluid flowing through the openings 280 in the middle plate 272 impinges on the vanes 288 and aids in causing the blocking piece 286 to rotate around the bottom plate 274 in the second slot chamber 282.

The vanes 288 can be designed in various ways to accept the kinetic energy of the fluid flowing through the openings 280 to cause rotation of the blocking piece 286. The vanes can be flat notches cut radially out of the blocking piece 286, or they can have angled or curved leading or trailing edges.

In some embodiments of the invention, the openings 280 are located radially outside of the first slot chamber 276 and are directed down to bottom plate 274 to the outer edge of the second slot chamber 282. In these embodiments, the openings 280 continue down from the middle plate 272 to the lower plate 274 and then are directed partially radially inward and at a tangential angle to impinge on the radially outward edge of the blocking piece 286 where the fluid flow can be directed at a tangential angle inward toward the blocking piece 286 and parallel to its movement. The vanes 288 on the blocking piece 286, in these embodiments are on the radially outside edge of the blocking piece 286, thus receiving the flow and kinetic energy from the openings 280. These embodiments will reduce a downward force on the blocking piece 286 allowing easier movement due to increased horizontal force, where the filter assembly 212 is in a vertical position, which results in less restriction of movement of the blocking piece 286. These are design choices that are made in several embodiments and can be implemented as seen fit for each application.

Still referring to FIG. 8, one or more intermittent grooves 292 can be added to the upper face of the bottom plate 274 in an annular direction with each groove 292 positioned between two adjacent apertures 284. The use of one or more grooves 292 in some embodiments helps reduce friction between the blocking piece 286 and the bottom plate 274, thereby facilitating rotation of the blocking piece 286.

Figure 8A:
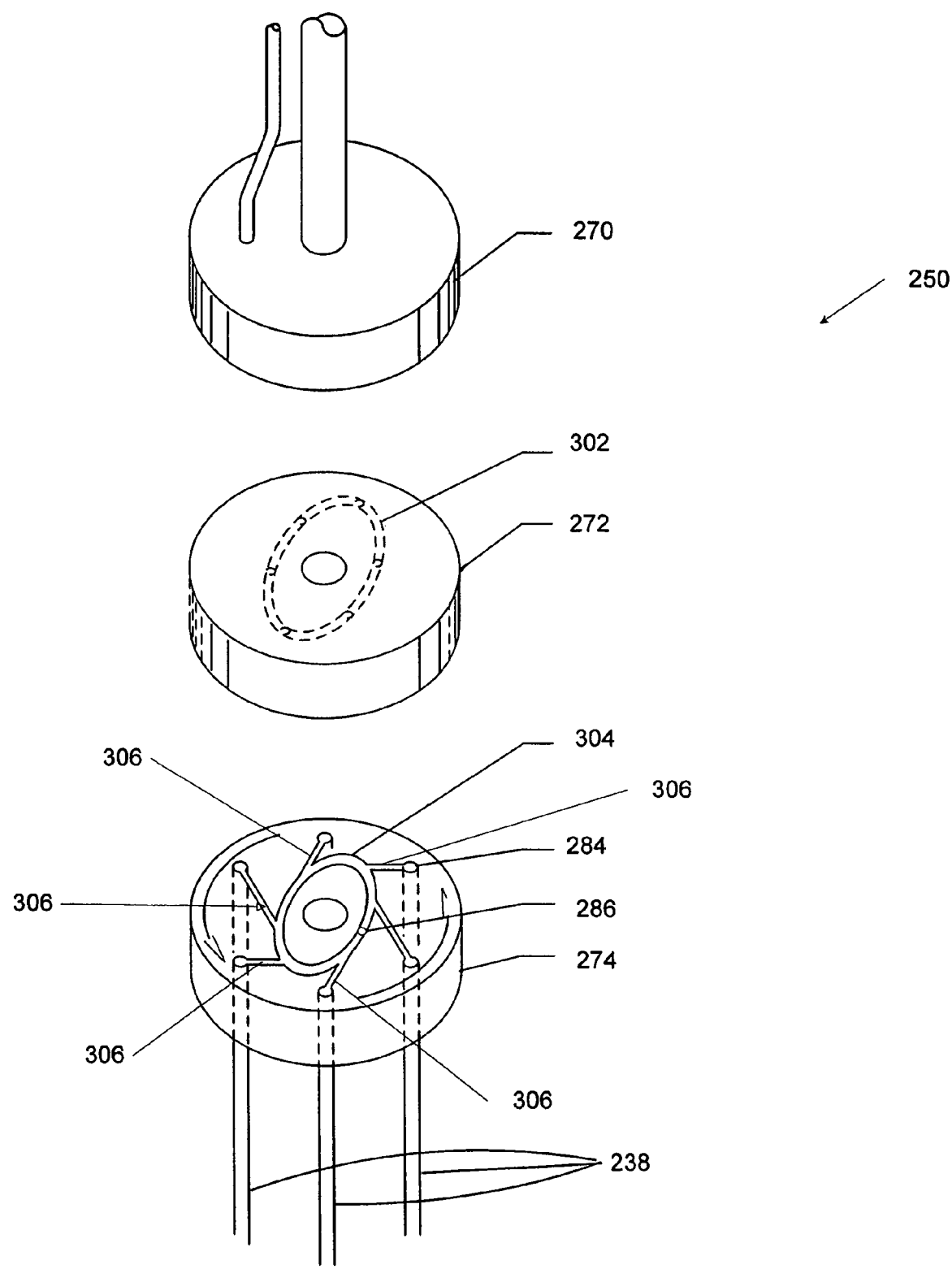
FIG. 8A is a view of another embodiment of a manifold similar to that of FIG. 8, but configured to induce a vibration of the manifold.

Another embodiment of a manifold 250 is depicted in FIG. 8A. In this embodiment, the middle plate 272 comprises an oval or elliptical shaped slot 302 located on a first surface thereof. A mating oval shaped slot 304 is located on the surface of lower plate 274, forms an oval slot chamber in which the blocking piece 286 may be rotated by the force of the flow of fluid through the manifold 250. In one embodiment, the blocking piece 286 is a substantially spherical ball. Rotation of the blocking piece 286 in the oval results in a periodic variation in the acceleration of the blocking piece 286 during its orbit through the oval path defined by the slots 302 and 304. The manifold 250 vibrates in response to the varying centripetal force of the piece 286. The vibration of the manifold 250 in turn causes vibration of the attached tubes 238. This vibration improves the efficiency of filter or membrane cleaning and helps to prevent fouling of filters and membranes. In the embodiment depicted in FIG. 8A, the apertures 284 are positioned outside the circumference of the oval. Thus, rather than directly blocking the flow of fluid to each aperture 284, the blocking piece 286 sequentially blocks the flow of fluid to a channel 306 that fluidly couples a corresponding aperture 284 to the slot 304. Slot 304 is in turn fluidly coupled to the flow of fluid through the manifold 250 by oval slot 302.

Figure 8B:
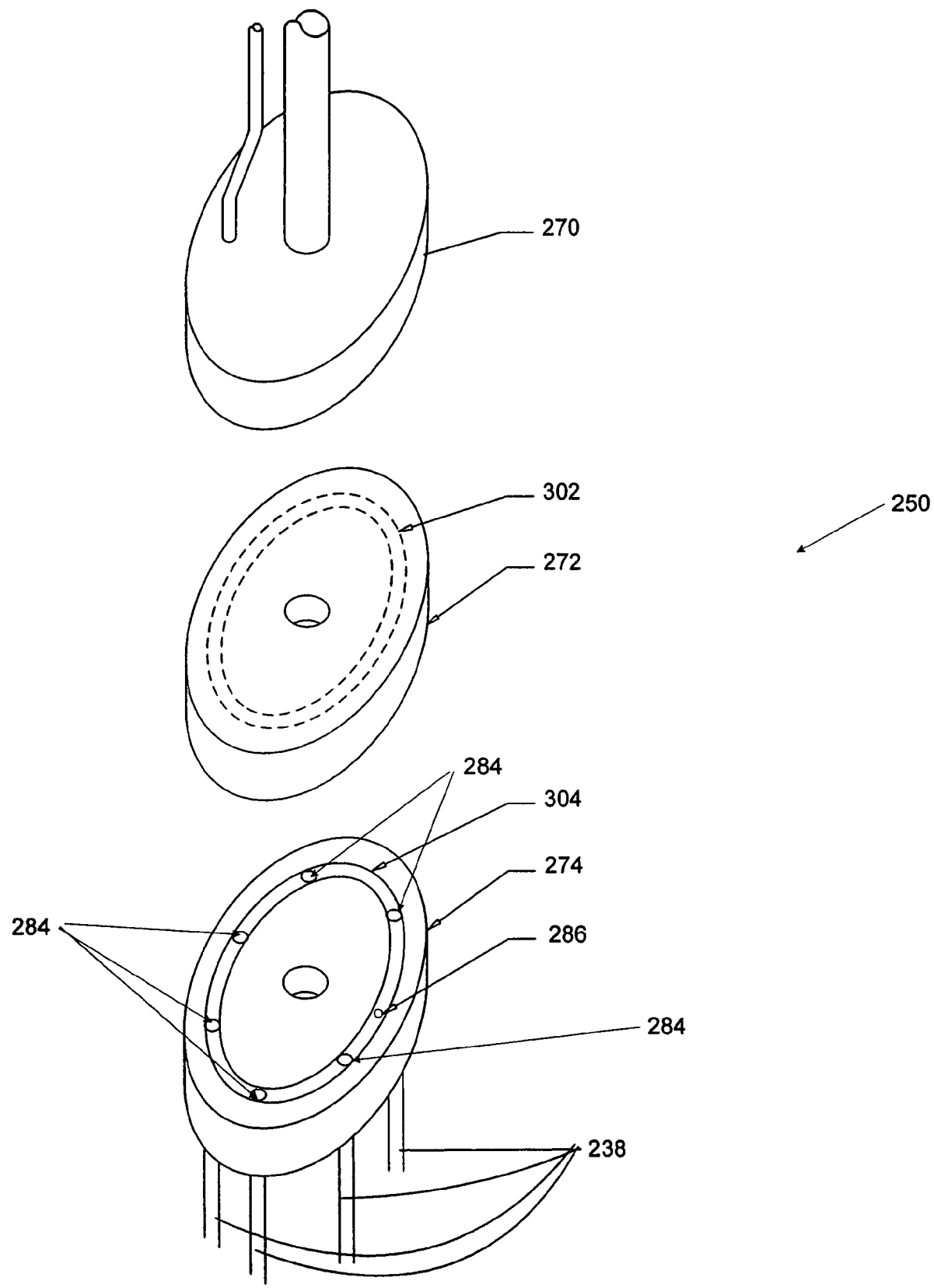
FIG. 8B depicts another embodiment of a manifold similar to that of FIG. 8A.

FIG. 8B depicts another embodiment of the manifold 250, similar to FIG. 8A, except that in this embodiment the tubes 238 are arranged, for example, in a generally oval or elliptically shaped pattern, with each tube 238 fluidly coupled to the respective aperture 284 that is located within the slot 304. Moreover, the entire manifold 250 may have an oval shape matching the eccentricity of the oval slot 302/304 for applications which do not require the manifold 250 to be circular in shape in order to fit into, for example, a well. While oval or elliptical shaped slots have been specifically disclosed, the invention may be embodied in other shapes as well, such as a figure-8, for example, all of which are included within the scope of the inventive subject matter.

Figure 9:
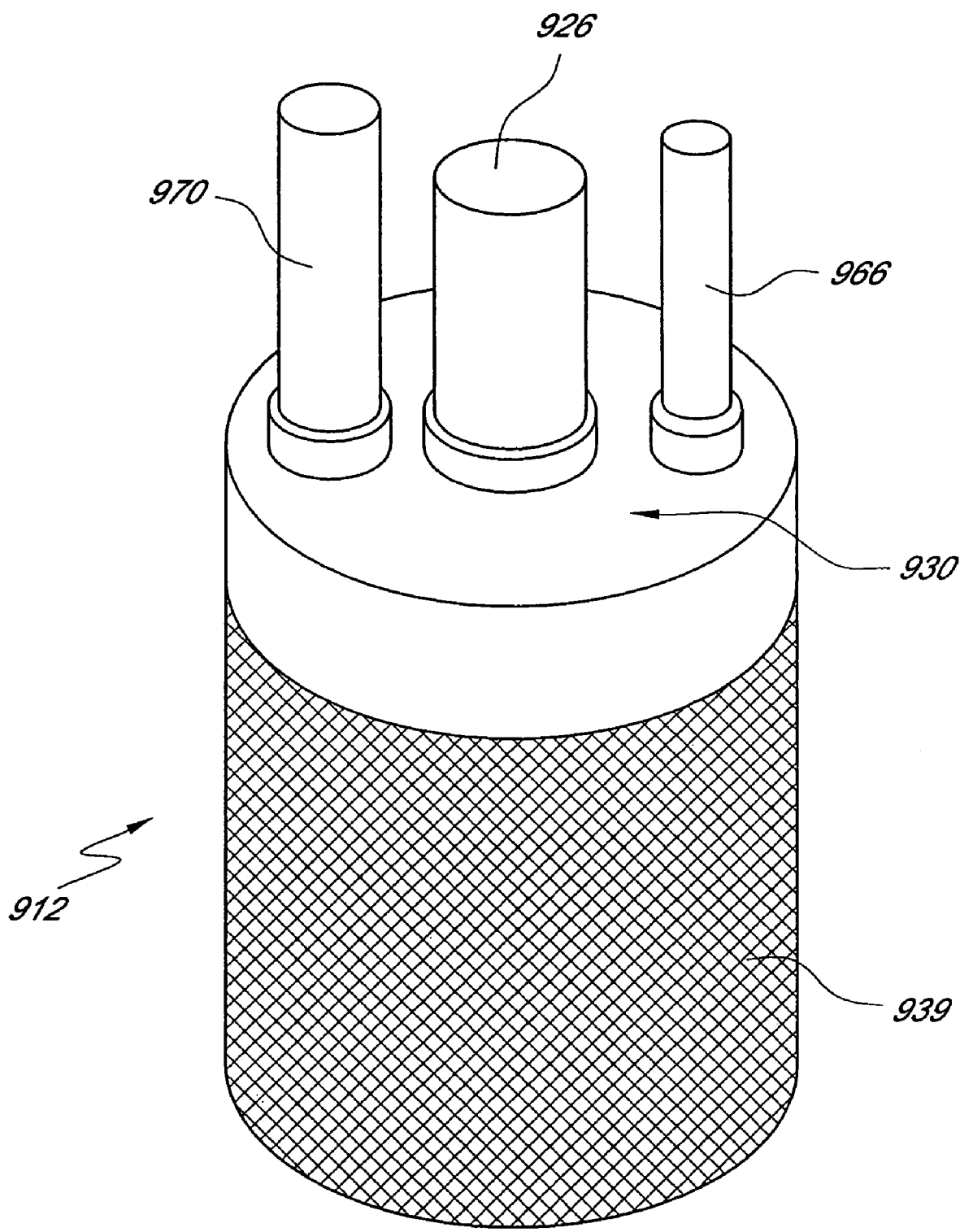
FIG. 9 is a perspective view of a filter assembly of one embodiment of the system of FIG. 5.

FIG. 9, is a perspective view of a filter assembly 912 of one embodiment of the invention. This filter assembly 912 utilizes a pump discharge line 926, which in embodiments not using a submersible pump (not shown) would be a suction line. As in other embodiments, the pump discharge line 926 extends through the top of the filter assembly 912 and into the middle of the filter assembly 912 itself. The filter assembly 912 also uses a flushing supply line 966 to supply flushing fluid to the filter assembly 912 for back flushing the filter assembly 912. Finally, the embodiment illustrated in FIG. 9 incorporates an expansion line 970 that extends from the middle of the filter assembly 912 up through the top 930 and up to the surface of the fluid being pumped thereby exposing the filter assembly 912 to atmospheric pressure. For instance, if the filter assembly 912 were used at a depth of 800 feet beneath the surface of the ocean, the inside of the filter assembly 912 would be at or about atmospheric pressure, while the outside of the filter assembly 912 would experience a pressure of about 357 psi above atmospheric. As fluid began to flow through the filter element 939, it would eventually fill up the inside of the filter assembly 912 and begin to rise up the expansion line 970 thereby raising the pressure in the inside of the filter assembly 912 and decreasing the differential pressure between the outside and inside of the filter assembly 912. However, in embodiments using a submersible pump (not shown), the water building up in the expansion line 970 provides net positive suction head to the suction of the pump, which can aid in the pumping efficiency of many pumps. As the pump begins to pump the filtered fluid up the discharge line 926 to the surface, the level of fluid in the expansion will drop until there is a balance between the flow rate of the pump and the rate of filtration through the filter assembly 912, at which time the level in the expansion line 970 will stabilize at a steady state level. In some embodiments, the pump efficiency will be unrelated to the suction head provided by the expansion line 970 and the level in the expansion line will always change unless the pumping rate is equivalent to the filtration rate.

The vent or expansion line 970 may, as in the embodiment depicted in FIG. 4C, be coupled to the second supply hose 40A. In one embodiment of the manifold 50, such as in FIG. 4C, the second supply hose 40A may be coupled to the vent or expansion line 970 which is in turn coupled to the atmosphere.

Figure 10:
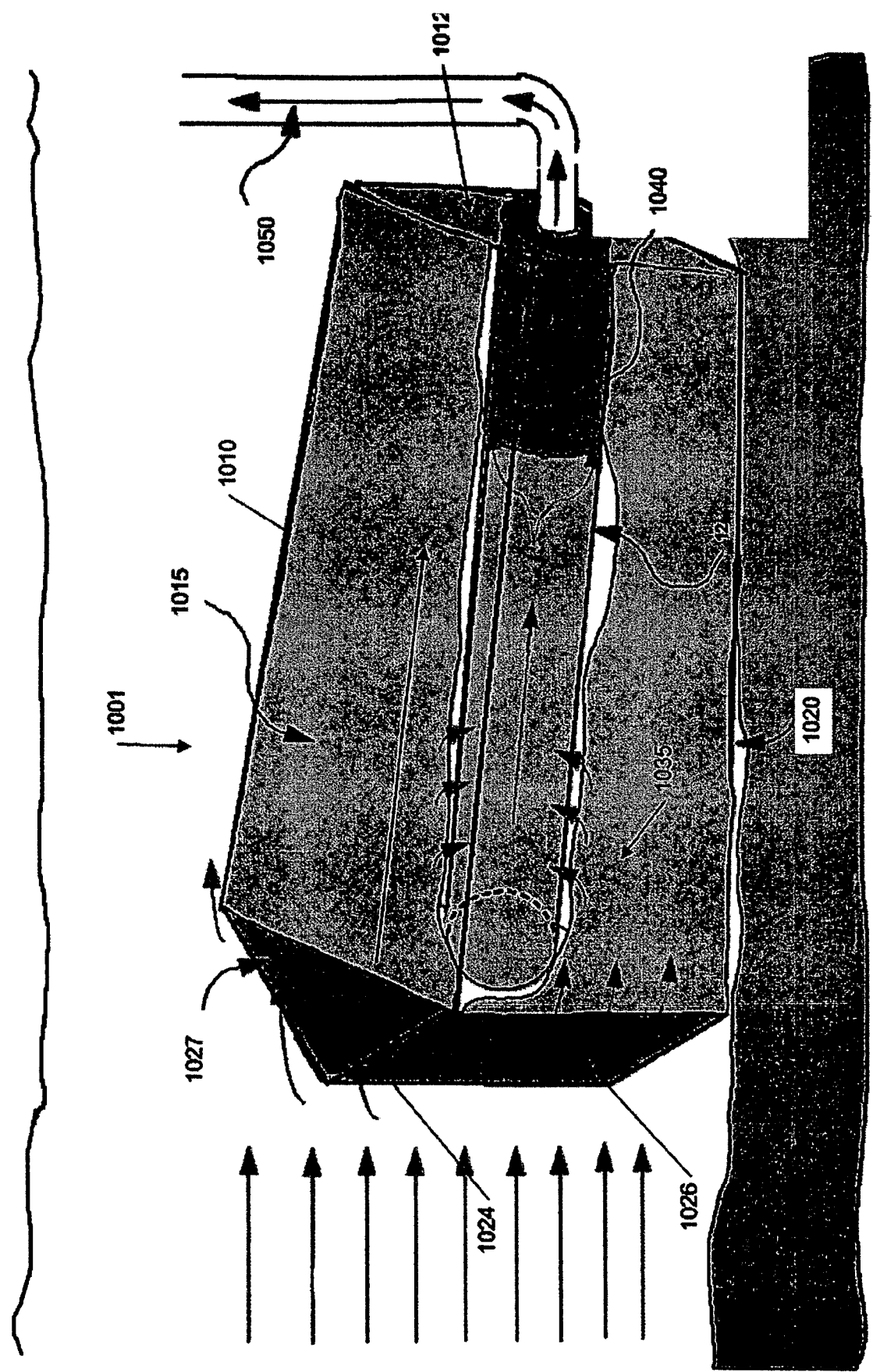
FIG. 10 depicts a side-perspective view of one embodiment of a fluid filtration system, which may advantageously be used in a river or stream.

Embodiments of a self cleaning filter apparatus 12 may also be used in conjunction with a system for pumping, filtering and purifying water from rivers or streams to obtain potable water. Pumping water through a self cleaning filter apparatus 12 minimizes the inflow of solids and thus reduces, or eliminates, the expense of providing a settling basin and maintenance costs associated with removing the sediment from the basin. FIG. 10 depicts one embodiment of a filtration system 1001, which comprises a self-cleaning filter apparatus 12 for pumping water from a stream or river. In the depicted embodiment, the self cleaning filter apparatus 12 is placed horizontally into a flow of water. The intake of the filter apparatus 12 faces into the direction of water flow. To prevent trash and other larger debris from impinging on the filter apparatus 12, an outer cage 1010 surrounds filter apparatus 12.

Figure 10A:
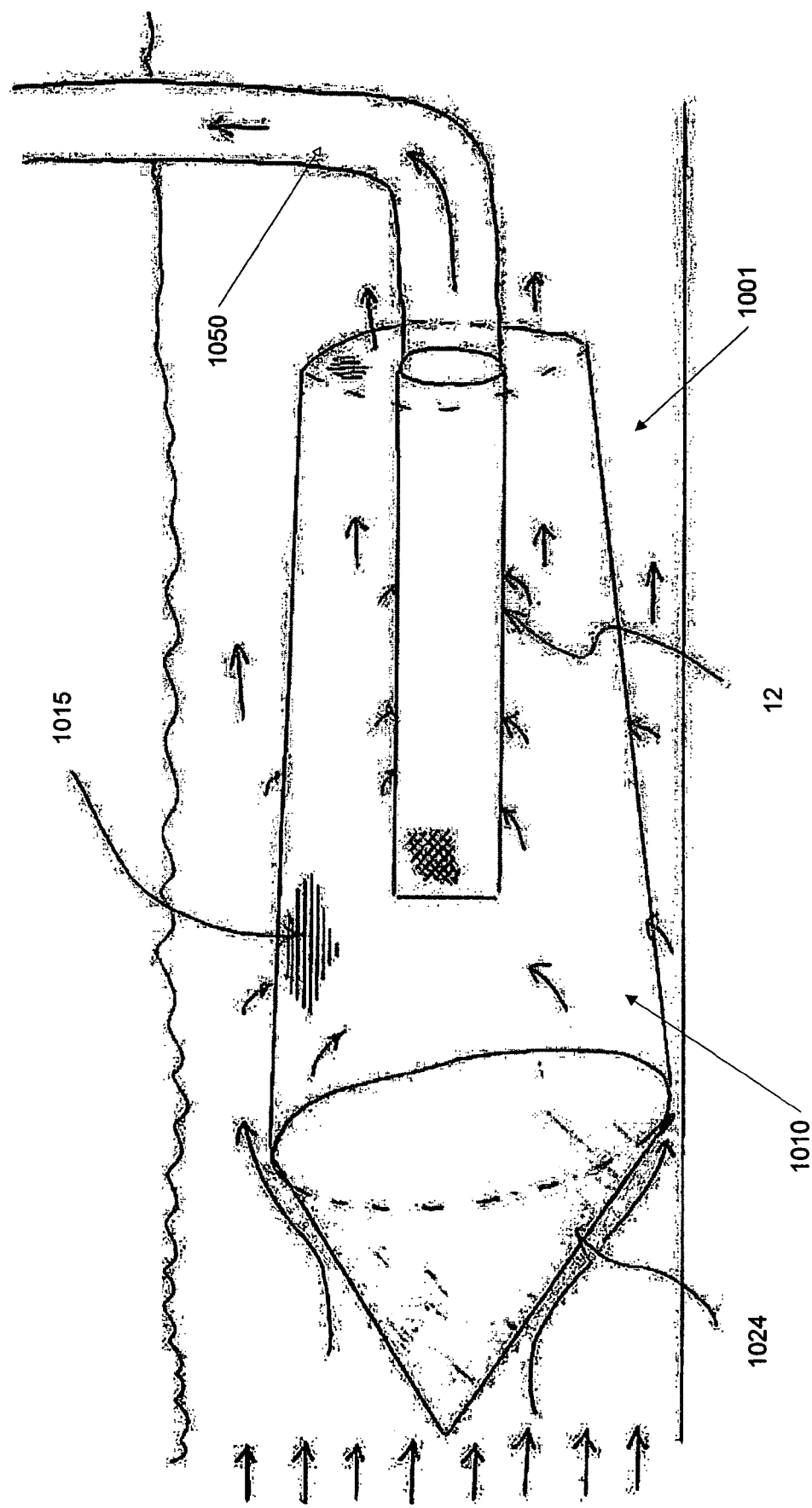
FIG. 10A depicts a side-perspective view of another embodiment of a fluid filtration system similar to FIG. 10 but having a conical front leading member.

In one embodiment, the outer cage 1010 is a trapezoidal shaped cage. A bottom member 1020 of the cage 1010 may be constructed of a solid, non-permeable, plate. Preferably, the other three side members 1015 are made of 2 mm wedge wire screen. A leading member 1024 of the cage 1010 may comprise two solid, non-permeable plates defining a "V" shape 1026 and two solid non-permeable top and bottom plates 1027. A rear surface, or trailing, member 1012 may comprise a wire screen material. The shape of the leading member 1024 gives the front of outer cage 1010 a shape a similar to the front of a boat. That is, the side members 1015 may be angled inwardly with respect to a centroid defined by the cage 1010 from the leading member 1024 to the trailing member 1012. The top member 1015 and the bottom member 1020 of the front of the cage 1010 may also comprise solid surfaces. This relatively aerodynamic shape helps to divert flowing water around the cage 1010 and to reduce the force of the flowing water current on the cage 1010. In another embodiment, illustrated by FIG. 10A, the front member 1024 may comprise a solid, non-permeable cone shaped plate coupled to a single cylindrical mesh side member 1015.

Returning to FIG. 10, when the filtration system 12 is placed in a river or stream, debris, for example, trash, may be present and tend to accumulate around the filter. Moreover, water fauna, including fish such as the silvery minnow, may accumulate on the cage 1010. Preferably, the outer cage 1010 narrows from front to back by having the top and side surface members 1015 angled off the parallel of the flow of current, and slightly into the filter apparatus 12 such that the cage 1010 has a cross section that decreases along the length of each side 1015 from the leading surface member 1024 to the trailing surface member 1012. Thus, when debris in the water flow encounters the cage 1010, the water flow will tend to push any debris down stream, and thus off of the cage 1010. Preferably, the area of the screen is large enough in proportion to the rate of water flow through the pump that the flow of water through the screen is less than the rate of the river/stream.

In one embodiment, the side members 1015 may also be angled outwardly with respect to the centroid defined by the cage 1010 from the bottom member 1020 to the top member 1015. Thus, gravity tends to pull debris down and away from the side members 1015 to further reduce the fouling or clogging of side members 1015.

As described above the outer cage 1010 filters large debris out of the flow of water. The self cleaning filter apparatus 12 further performs a micro-filtration of the water as discussed herein. Preferably, the sides 1015 of cage 1010 comprise a filter mesh. In preferred embodiments, the filter apparatus 12 comprises a filter element 34 having a mesh or filter size smaller than that of the sides 1015.

In one embodiment, a submersible pump and motor 1040 are disposed within the filter apparatus 12 to pump the filtered water to the surface. In another embodiment, a filtration system 1001 comprises a surface water pump. Filtered water passes to the surface through a discharge line 1050.

Figure 11:
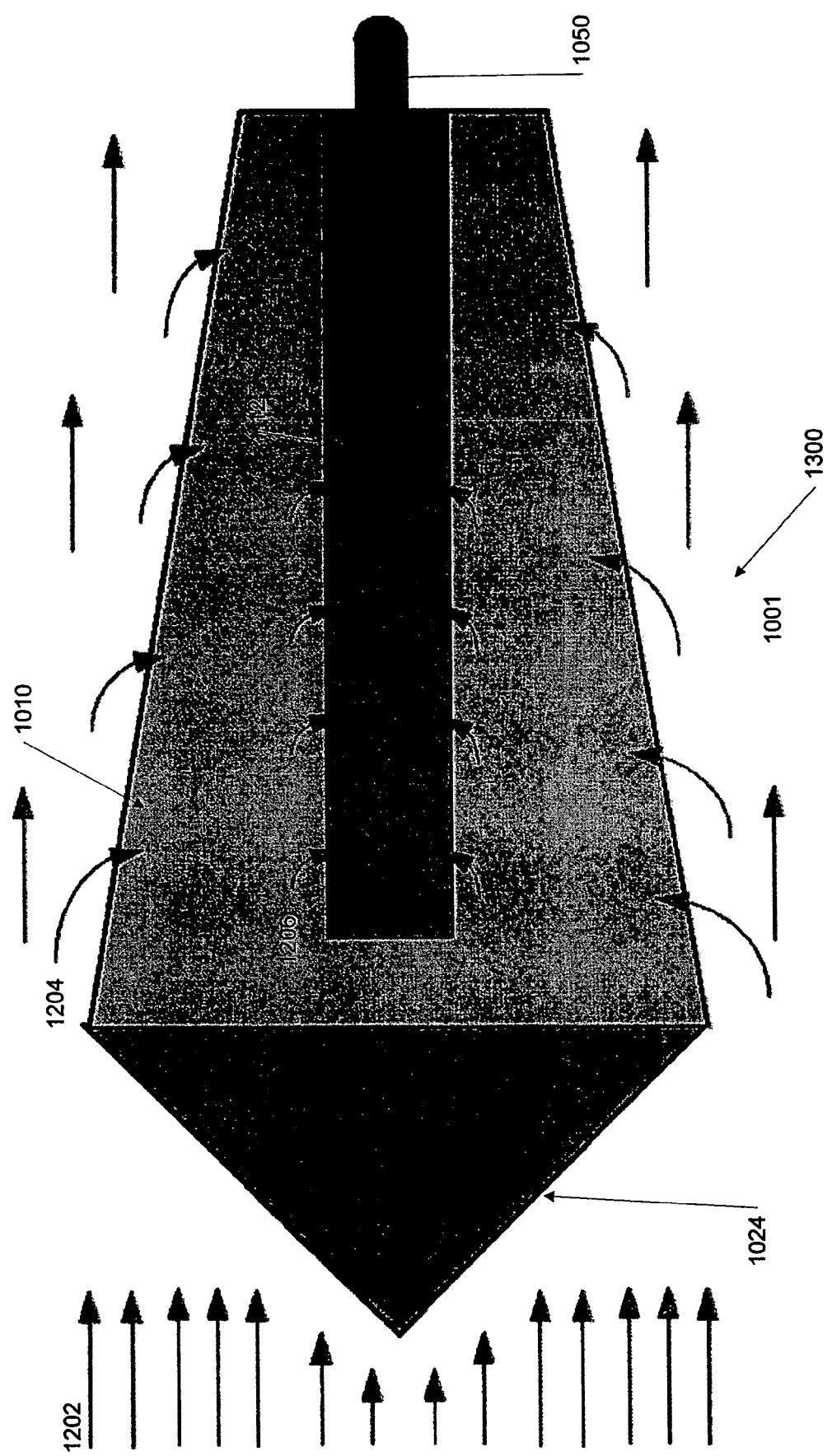
FIG. 11 depicts a top-profile view of the fluid filtration system of FIG. 10 depicting the flow of water around the system.

FIG. 11 depicts a top profile view of one embodiment of the filtration system 1001. The side members 1015 of the outer cage 1010 are configured with respect to the flow of fluid and the leading member 1024 so that the flow of fluid carries debris away from the side members 1015 and thereby helps to prevent fouling or clogging. In the embodiment depicted in FIG. 11, water flowing as indicated by arrow 1202 passes over the front member 1024 of the cage 1010. The flow continues along the side members 1015 of the cage 1010, and through the mesh side 1015 as indicated by arrow 1204. Because this direction 1204 is skewed slightly into the cage 1010 from the general direction 1202 of the flow, trash and debris tend to be carried past the side members 1015 by the flow in direction 1202 without accumulating. Within the cage 1010, pump suction causes water to flow in the direction of arrow 1206 into the filter apparatus 12 and then to the surface. By utilizing a filtration system 1001, maintenance costs associated with clogging and fouling of the filter system 1001 by debris are reduced. In addition, the impact of such pumping on water fauna, including endangered species such as the Silvery Minnow, is reduced.

When using the filter apparatus 12 according to filter embodiments disclosed herein, sediment may tend to settle in the fluid body after cleaning the filter. This may be particularly problematic when the filter apparatus 12 is installed in a confined space such as, for example, a deep well. For example, sand may tend to settle in the area around the filter apparatus 12 in water well. Embodiments according to the invention may be used to remove such sediment without removing the pump from the well, as discussed in detail below.

Figure 12:
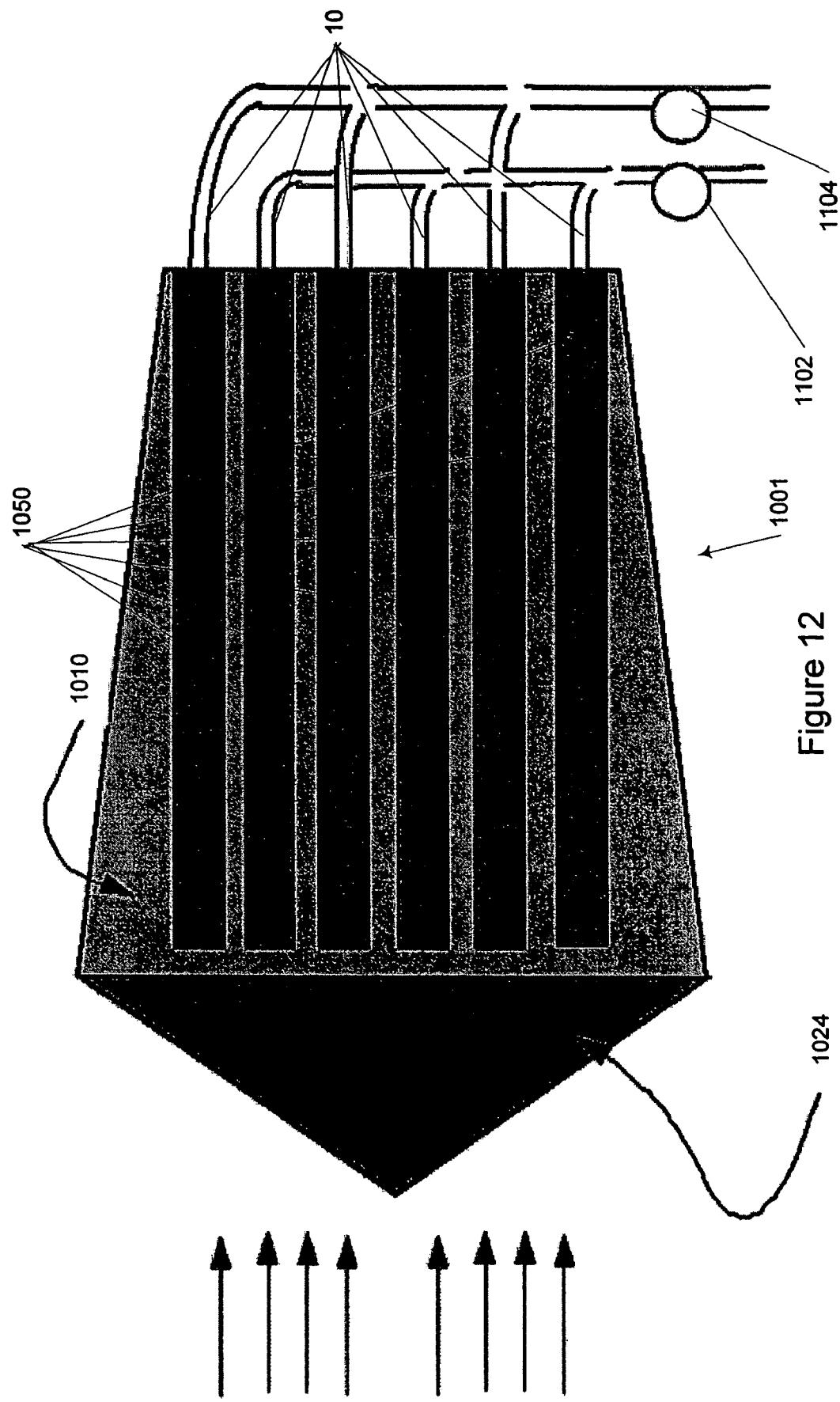
FIG. 12 illustrates a top-profile view of the fluid filtration system of another embodiment of a fluid filtration system similar to that of FIG. 10 but having a plurality of self cleaning filters.

As depicted in FIG. 12, in one embodiment, a several filter apparatus 12 are disposed within the filtration system 1001. Preferably, one surface pump 1102 is fluidly connected to the discharge line 1050 of each of the several filter apparatus 12. In one embodiment, for example, two pumps 1102 and 1104 are each fluidly connected to the discharge line 1050 of three filter apparatus 12. In one embodiment, additional mesh surfaces 1015 separate each of the plurality of filter apparatus 12 from each other.

Figure 13:
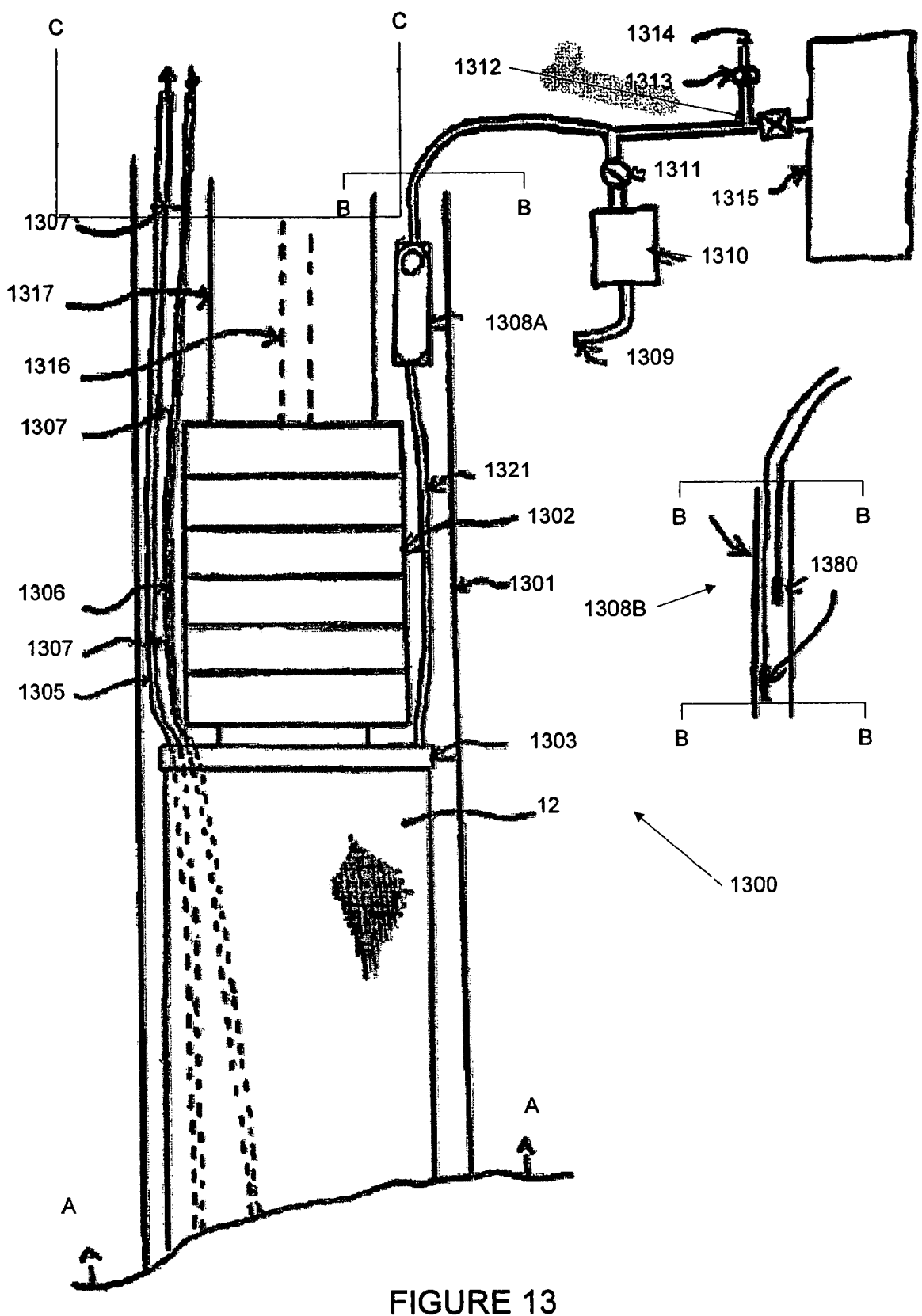
FIG. 13 depicts a side cross-sectional view of an upper portion of an embodiment of a fluid filtration system having a sediment removal system.

FIG. 13 depicts a side cross sectional view of one embodiment of a settlement removal system 1300 that includes the self-cleaning filter system 12. The system 1300 comprises a well casing 1301, a submersible pump 1302, a manifold 1303, and the self-cleaning filter 12. A sediment discharge line 1305 allows the sediment to be carried therethrough to the surface by one or more venturi jet lifts 1307. A pressure line 1306 supplies the high pressure needed for the jet lifts 1307. It has been found that by placing one ore more venturi jet lifts 1307 along a discharge line 1305, sediment can be removed from even very deep wells. The filter system 12 receives filtered fluid which, in an embodiment using a submersible pump, passes through the submersible pump 1321 and into a discharge, or filtered fluid pipe 1317.

A backflush line 1321 connects the manifold 1303 of filter apparatus 12 to a tank 1315. If air is pulled or sucked into a pump, damage may occur. In one embodiment, in-line on the back flush line 1321 is an air check valve 1308A. In another embodiment, a fluid level pump shut off switch 1308B is configured in-line of line 1321. An embodiment having either an air check valve 1308A or a shut off switch 1308B advantageously reduces the danger of air being sucked into, and thereby damaging, the pump.

In one embodiment, the air check valve 1308A comprises a floating ball in a chamber that is placed in-line on back flush line 1321. When the fluid level is below that of the valve 1308A, the ball will fall by gravity and seal the outlet from the chamber to the manifold, preventing air from entering the manifold and filter. A fluid such as water is best used for back flushing in conjunction with this embodiment.

In another embodiment, a pump shut off switch 1308B may be placed in the back flush line 1321 at, for example, a position along line B-B. Switch 1308B may comprise a pair of sensors 1380, a control circuit (not shown), and an electrical switch (not shown). The sensors 1380 may be configured to send a signal along sensing cables 1381 to a control circuit to change the state of the electrical switch. In one embodiment, the electrical switch closes to run the pump 1302 when water is touching or in contact with both of the sensors 1380. If the fluid goes below the level the sensors 1380, the circuit is broken and the pump 1302 is shut off. In one embodiment, the system 1300 may comprise both an air check valve 1308A and a pump shut off switch 1308B. The air check valve 1308A helps to prevent air from infiltrating the system when, for example, a clog elsewhere in the system causes pump suction to pull air into the back flush line 1321. When this occurs, a pump shut off switch 1308B further prevents the pump from causing the system to implode. Preferably, when using both the valve 1308A and the switch 1308B, the switch 1308B is placed above the valve 1308A with respect to fluid level and proximity to the surface of the fluid, as indicated by line B-B, to allow the sensing cables attached to sensors 1380 to travel inside the back flush line 1321 to the fluid surface and the control circuit.

A solenoid valve 1312 is located in the backflush line 1321 between the supply tank 1315 and the filter apparatus 12. In one embodiment, an air inlet 1309 lets air into a vacuum valve 1310 which is connected to the back flush line 1311. The vacuum valve 1310 is located inline with a check valve 1311 which is then tied into the back flush line 1321. These components allow venting through the back flush line 1321 while pumping. As discussed herein with respect to the vent line 970, venting to the atmosphere tends to increase the pressure differential across the filter membrane and thereby increase fluid throughput in the system 1300. An inlet 1314 may be connected to a valve 1313 to allow chemical agents to be injected before or during the back flushing cycle. Chemical agents may be useful in the cleaning process if the filter is very clogged or caked. In an embodiment with a submersible pump, a pump drive shaft 1316 is provided in the discharge or filtered fluid pipe 1317.

Figure 14:
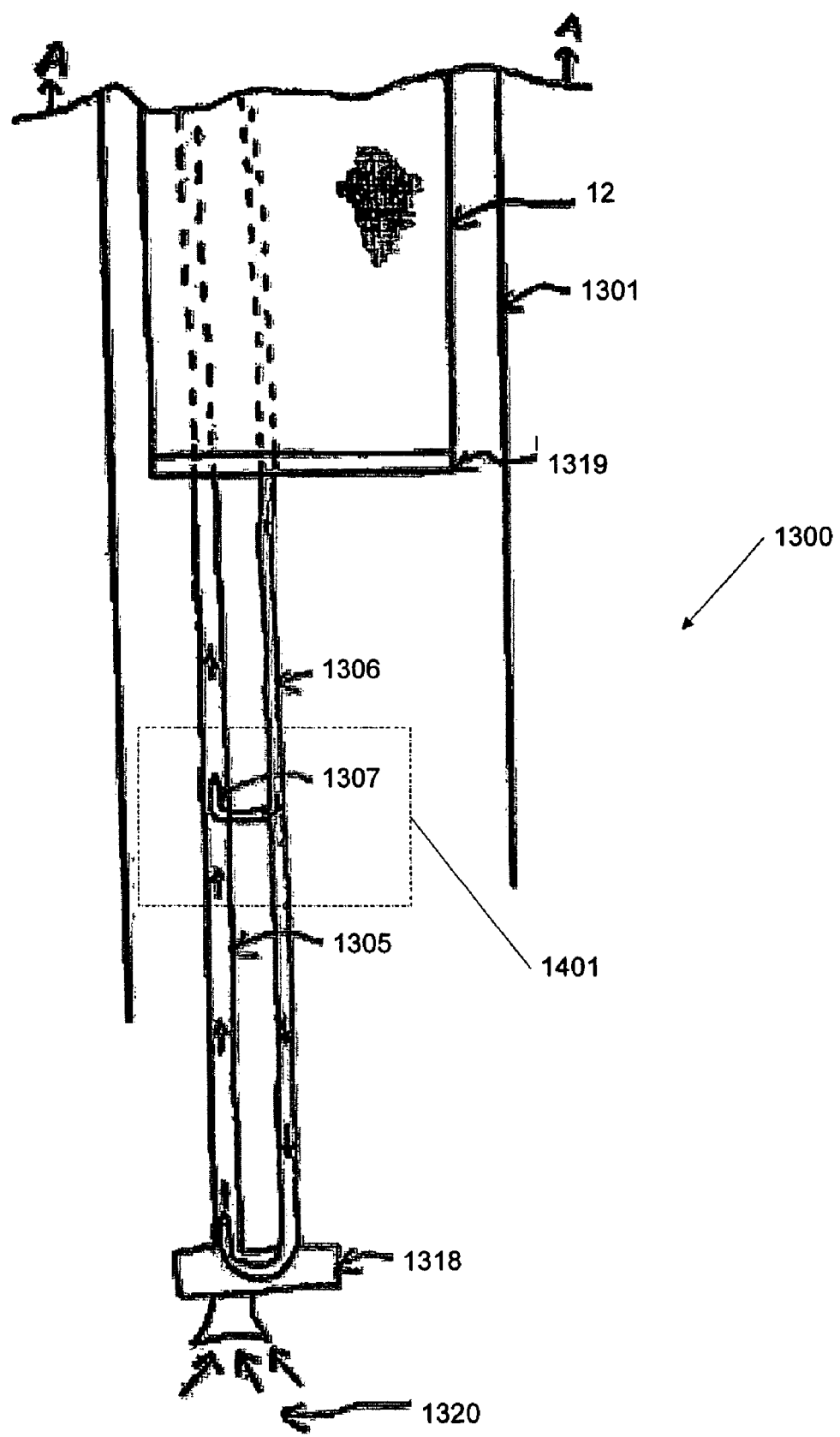
FIG. 14 depicts a side cross-sectional view of the lower portion of the embodiment of a sediment removal system of FIG. 13, connecting with the portion illustrated in FIG. 13 along line A-A.

FIG. 14 depicts the remaining below ground portion of the embodiment of the sediment removal system depicted in FIG. 13 connected along a line A-A in each figure. The pressure line 1306 delivers a high pressure flow of water to a venturi jet pump 1318 and, in one embodiment, a venturi jet lift 1341. The venturi jet pump 1318 couples the pressure line 1306 with the sediment discharge line 1305 to provide the necessary pressure to suck sediment from, for example, the bottom of a deep well. This sediment removal process advantageously reduces fouling or clogging of filters and helps to reduce sediment caused damage to any pumps in-line with the system.

Figure 15:
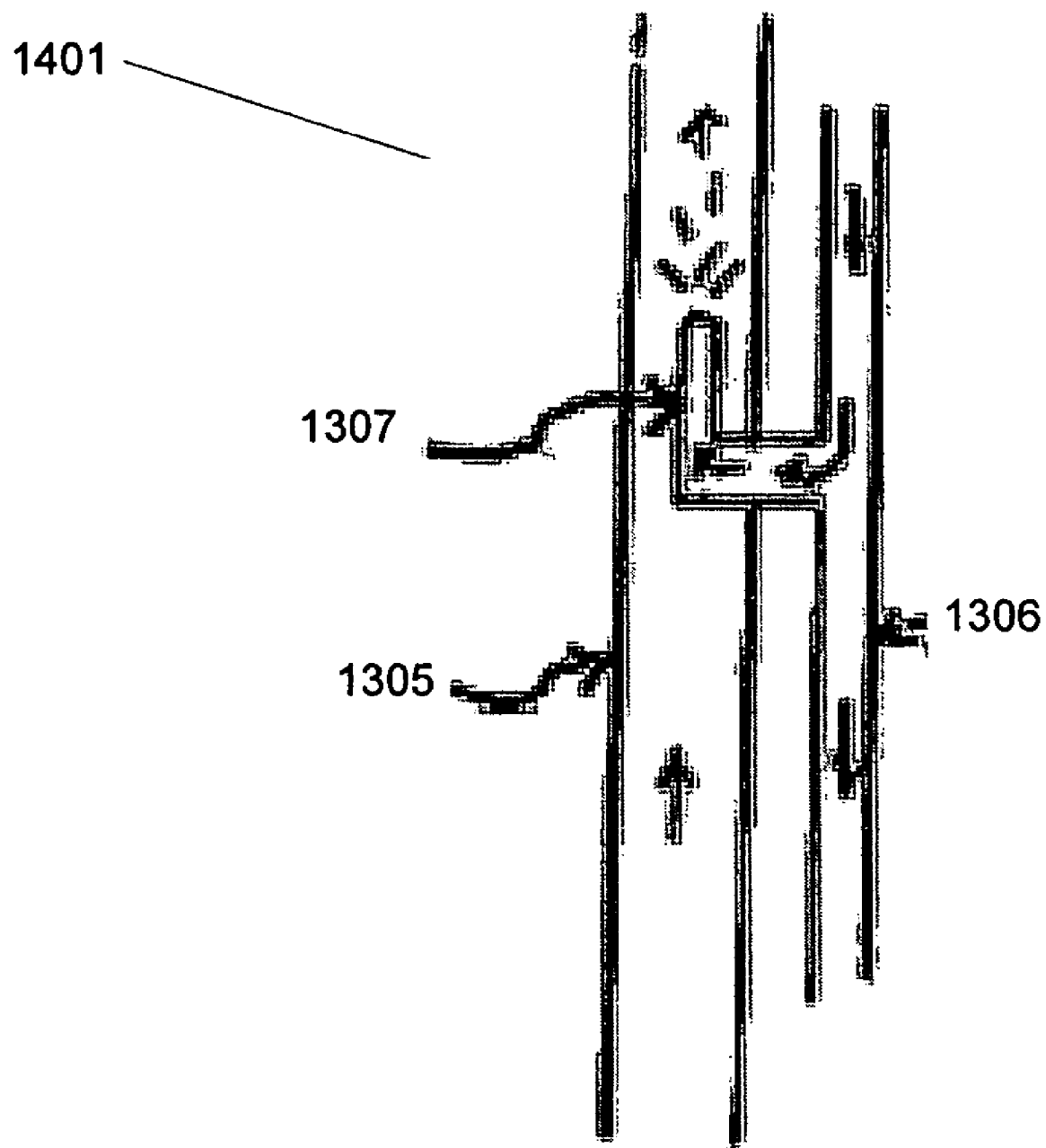
FIG. 15 illustrates a side cross-sectional view of venturi jets in an embodiment according to that shown in FIG. 13.

In one embodiment, lines 1306 and 1305 may pass within the manifold 1303 and base plate 1319 to the surface to allow more room between the filter apparatus 12 and casing 1301. In another embodiment, such as where more space is available, the lines 1305 and 1306 may venturi run between the filter apparatus 12 and the inside of the well casing 1301. FIG. 15 illustrates a close up view of a venturi jet lift 1401, comprising the pressure tube 1306 and a venturi jet 1307, which may be placed at intervals as required for a particular depth well along the discharge tube 1305. In operation in a deep well, the sediment removal system 1300 may be run either continuously or as needed, depending, for example, on the amount of sediment in the well and the rate of water pumping to prevent sediment from accumulating around the filter apparatus 12.

Figure 16:
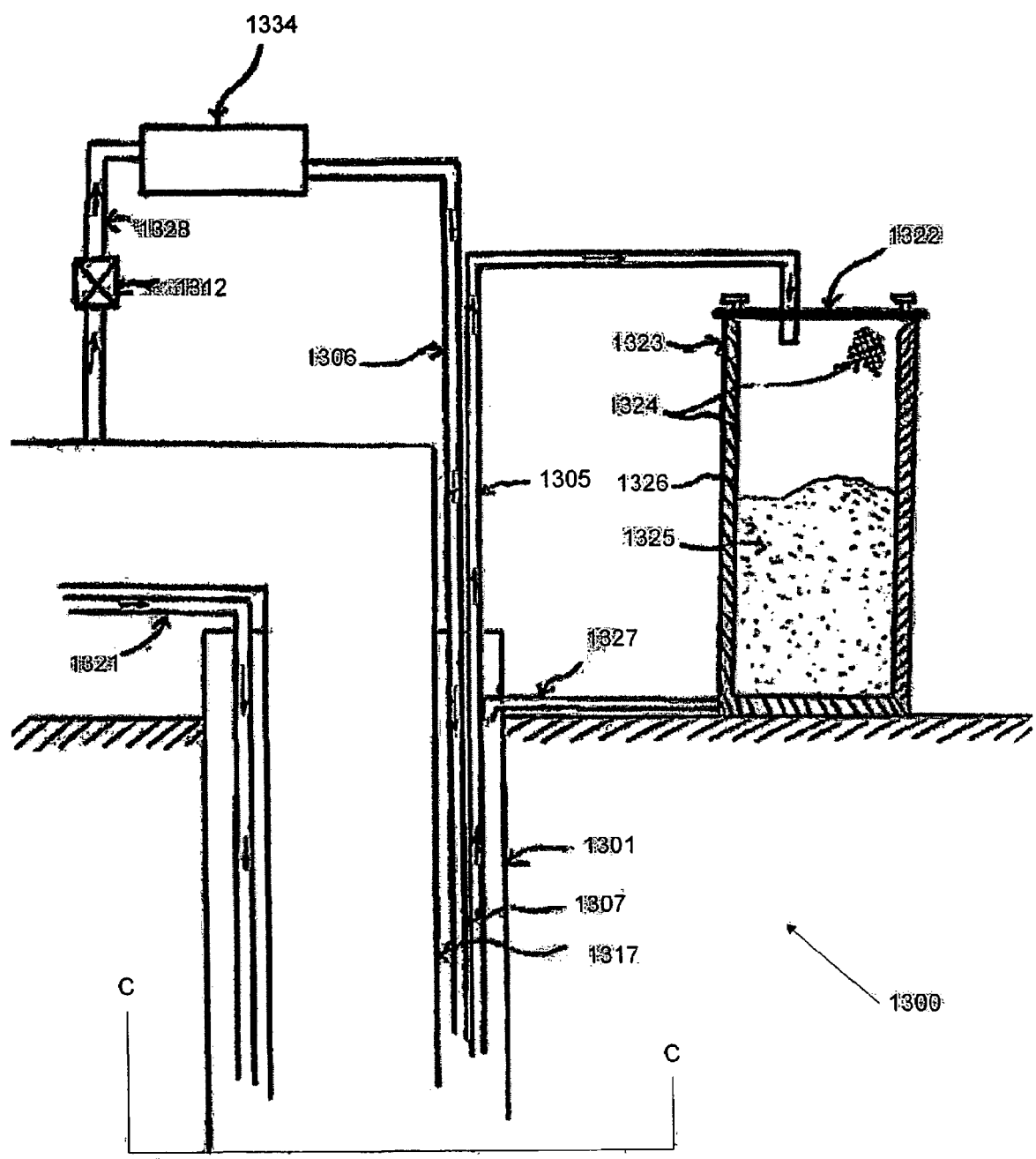
FIG. 16 illustrates a side cross-sectional view of the components that reside outside the body of fluid in one embodiment of a sediment removal system of FIG. 13.

FIG. 16 depicts the above ground portion of the embodiment of the sediment removal system depicted in FIG. 13 connected along a line C-C in each figure. After the sediment is removed to the ground surface by, for example, venturi jets 1307 as illustrated in FIG. 14, the sediment, suspended in the flow of water, enters a sealed pressure vessel 1323 from the sediment discharge line 1305. The pressure vessel 1323 may comprise a filter bag 1324 and sealed lid 1322, and a cage/screen. The cage 1326 separates the filter bag 1324 from the pressure vessel 1323 to form a space for fluid to pass through the filter bag 1324. While the cage 1326 is not necessary, if one is not present, the filter bag 1324 may tend to press against the sides of the pressure vessel 1323 and thus reduce the usable surface area of the filter bag 1324 and thus reduce the flow rate of fluid through he filter bag 1324. After fluid/sediment mixture enters the vessel through discharge line 1305, the sediment 1325 remains and the filtered fluid drains back into the well case 1301 through line 1327. Advantageously, the sediment material may comprise washed sand, a valuable resource.

While in one embodiment, fluid that passes through the pressure vessel 1323 may pass back into the well or fluid body through line 1327, it is to be appreciated that in other embodiments, line 1327 may be used to supply water from the well or fluid body. In still another embodiment the line 1327 may be configured to supply the water to the high pressure line 1306.

To supply the driving force for the venturi pump and lifting jets, a pressure booster pump 1334 may receive fluid from the discharge pipe 1317 through a line 1328. The solenoid valve 1312 on line 1328 may open automatically when the pressure booster pump 1334 is turned on. The use of venturi jets, which function to remove sediment, allows the pump 1334 to remain conveniently on the surface in place of a second submersible pump.

Figure 17:
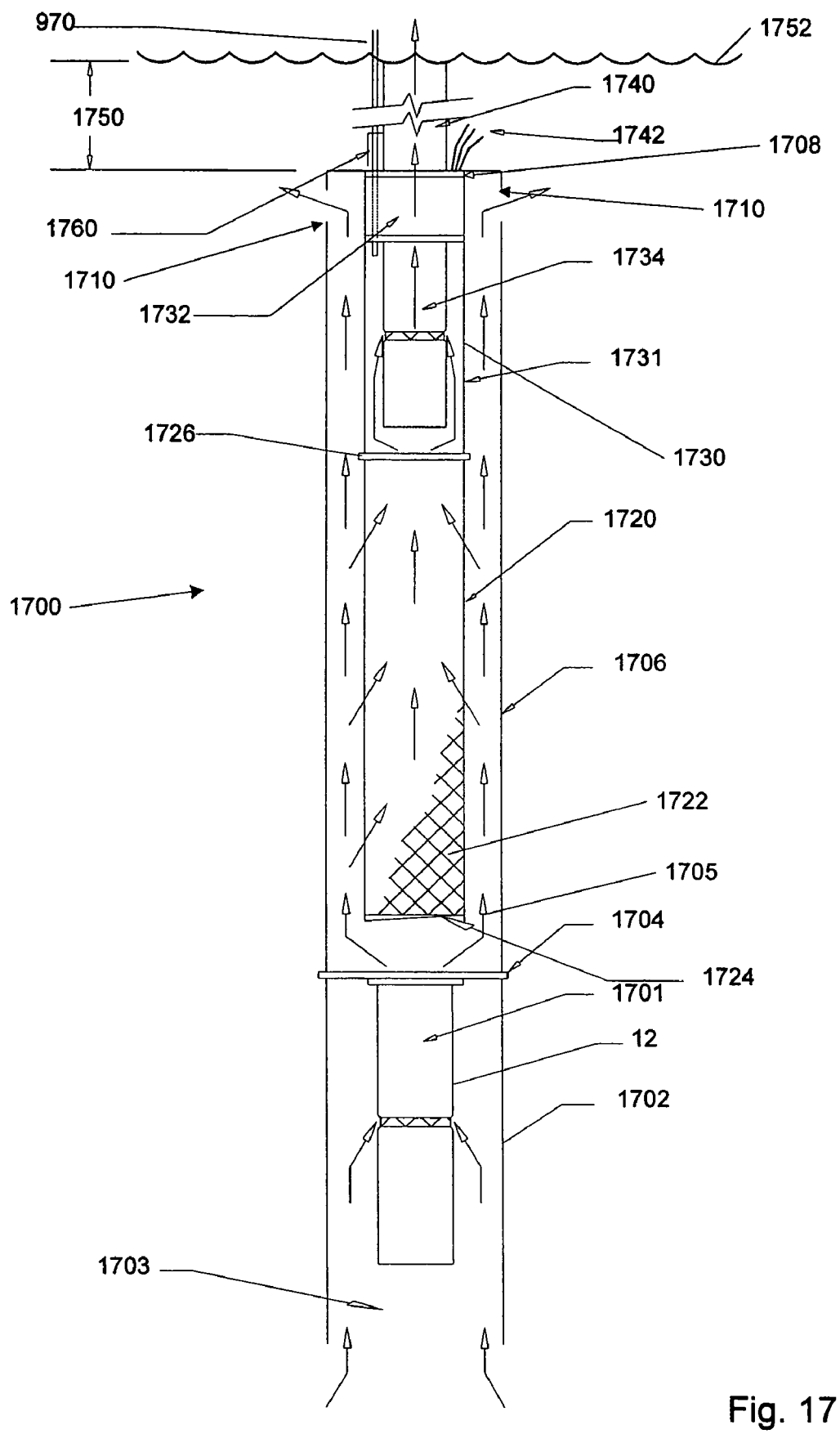
FIG. 17 depicts an embodiment of a filter system employing a cross flow membrane.

It has been found that clogging and fouling of cross flow membranes may be reduced by configuring the flow of fluids in a cross flow filtration system to provide a shearing flow of fluid generally parallel to the cross flow membrane surface that flushes sediment away from the cross flow membrane. FIG. 17 depicts one embodiment of a filtering system 1700 that accomplishes this flushing activity by use of cross flow membrane technology and two submersible pumps. The system 1700 may also use the natural pressure differential created by gravity, discussed with respect to FIG. 9, by placing the system 1700 at the required depth below the static or dynamic fluid surface to enhance pumping pressure in the system. It is to be appreciated that while certain embodiments are discussed with respect to cross flow membranes, embodiments may be constructed using other types of filters, such as, for example, mesh filters, or ceramic filters. Moreover, as would be apparent to one of skill in the art, while certain embodiments are discussed with respect to a single filter, other embodiments may be constructed with a plurality of filters and associated pipes to, for example, obtain increased flow rates.

In the filtering system 1700, a pump 1701 is housed within a shroud 1702 which may comprise a tube or cylindrically shaped impermeable surface. In the embodiment depicted in FIG. 17, the pump 1701 comprises a submersible pump and motor. The pump 1701 pulls a fluid to be filtered, e.g. water, through an inlet 1703. The fluid may be filtered by an initial filter, such as, for example, the self cleaning filter apparatus 12, discussed above. The fluid passes through a sealed opening in a pump mount 1704 to form a flow of fluid 1705 within a pressure tube chamber 1706. The pump mount 1704 may comprise a seal that separates the fluid within the shroud from that flowing within the pressure tube chamber 1706.

The pressure tube chamber 1706 encloses a filtered fluid chamber 1720. One or more fluid outlets 1710 may be placed around the circumference of the pressure tube chamber 1706 to provide a path for fluid that does not enter the filtered fluid chamber 1720 to flow out of the tube.

The filtered fluid chamber 1720 comprises a cross flow membrane 1722 which forms the sides of the chamber 1720. The chamber 1720 may have a non-permeable end 1724. At the top end 1706 of the chamber 1720, a chamber connection ring 1726 secures the filtered fluid chamber 1720 to the pressure chamber 1730 and fluidly connects the filtered fluid chamber 1720 with a pump chamber 1730 via an opening in the center portion of the ring 1726. The pump chamber 1730 preferably comprises an impermeable surface 1731 which encloses a pump 1734. The top of the chamber 1730 may comprise a seal 1732 through which passes a discharge tube 1740. The top of the pressure tube chamber 1706 may comprise a non-permeable surface 1708 which also forms a top seal around the discharge tube 1740. The discharge tube 1740 carries filtered fluid out of the system 1700. An expansion, or vent tube 970 may also pass through the seal 1732 fluidly connecting the interior of the pump chamber 1730 with atmospheric pressure so as to increase the pressure differential, as discussed previously.

Thus, with the aid of the pump 1701, fluid may first pass through an additional self cleaning fluid apparatus 12 into the pressure tube chamber 1706, where a portion of that fluid flows across the cross flow membrane 1722 and into the chamber 1720. The remainder of the fluid in the chamber 1706, which will have a concentrated level of impurities, flows parallel to the cross-flow membrane 1722 and out of the pressure tube chamber 1706 through the outlets 1710. The fluid which passed through the membrane 1722, flows through an opening in the chamber connection ring 1726 and into the pump chamber 1730. The fluid then passes from the pump chamber 1730 through the discharge tube 1740 and out of filtering system 1700. The parallel flow along the cross flow membrane 1722 forces sediment away from the membrane 1722 to reduce clogging and fouling of the membrane 1722. Preferably, the outlets 1710 are positioned at a distance from the inlet 1703 that prevents fluid with the concentrated level of impurities from entering the inlet 1703 without first being diluted by fluid in the surrounding fluid body.

Figure 18:
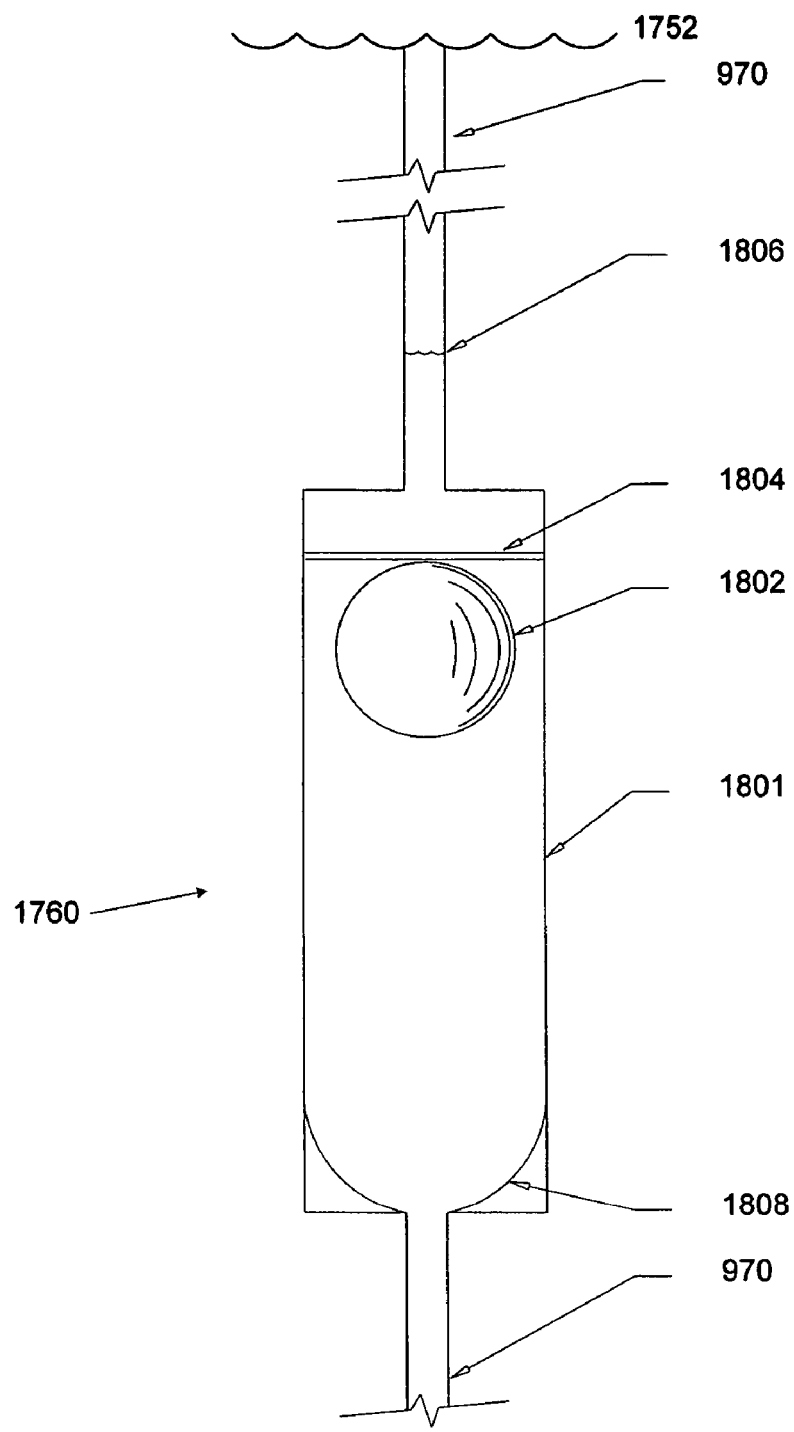
FIG. 18 is a side cross-section view of an embodiment of a gas/fluid separator chamber, such as is included in the embodiment of a filter system depicted in FIG. 17.

As discussed above with respect to FIG. 9, the expansion, or vent, tube 970 may fluidly connect the pump chamber 1730 to the atmosphere. The filter system 1700 is preferably located at a depth, indicated by line 1750, from the surface of the fluid body 1752 in which the system 1700 is submerged which depth is sufficient to provide adequate gravity pressure for the fluid to pass through the cross flow membrane. In one embodiment, the vent tube 970 may comprise a gas/fluid separator chamber 1760. As shown in detail in FIG. 18, the gas/fluid separator 1760 may comprise a chamber 1801. A gas filled sphere 1802 is configured to float within fluid in the chamber 1801 when the tube is submerged. A stop 1804 may be provided across the chamber 1801 to limit the upward flotation of the sphere 1802. In one embodiment, the stop may, for example, comprise a screen material which is connected to the interior surface forming the chamber 1801. The lower end of the chamber 1801 may be shaped to form a gas seal 1808. In normal operation, an air/water interface is formed at a height 1806 such that the sphere 1802 floats above the seal 1808. The height 1806 may depend, for example, on the atmospheric pressure and on the operation of pumps 1701 and 1734. In the event that membrane 1722 should become clogged, the suction generated by the pump 1734 will cause the air/interface to drop below the height of the gas seal 1808. In this circumstance, the sphere 1802 will fall under the force of gravity and block air from passing through the gas seal 1808. The pump 1734 will thus be protected from damage that could be caused by air. One skilled in the art will recognize that level sensors (not shown) may be placed inside the vent tube 970 near the seal 1732 to shut off the pumps 1734 and 1701, if necessary. Pressure sensors may also be placed in at least one of the inside the chambers 1706 or 1730 to detect and provide a warning of extreme pressures which might cause an implosion of the respective chamber. Electrical supply lines 1742 may pass through top seal 1708 to couple with the pump 1734 or the pump 1701. The electrical supply lines may pass through the side of the pressure tube 1706 to couple with the pumps 1701 and 1734.

Figure 19:
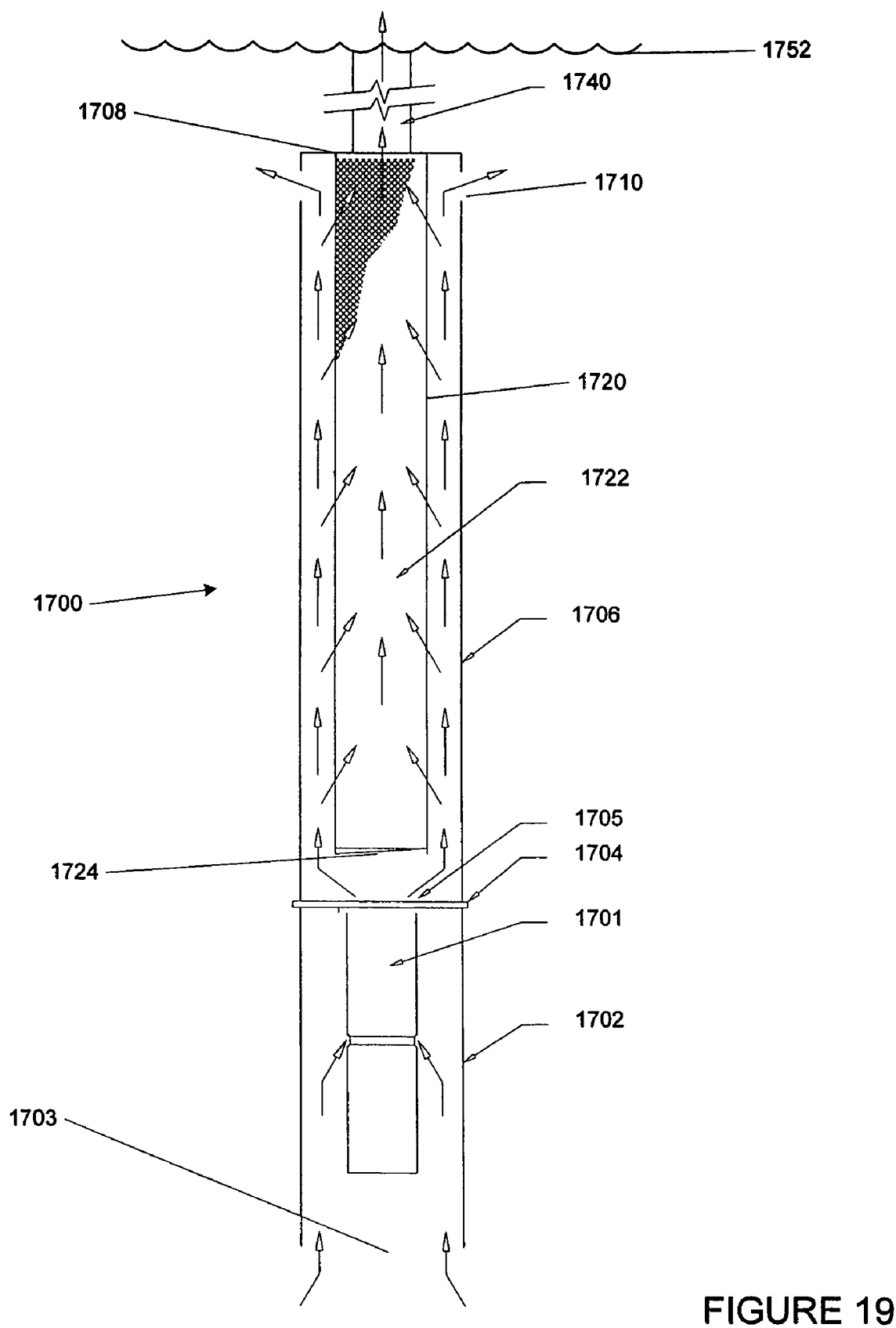
FIG. 19 depicts another embodiment of a cross flow filtration system similar to that of FIG. 17, but using a single high pressure pump.

FIG. 19 illustrates another embodiment of the filter system 1700 comprising a single, high flow pressure pump

1701. This embodiment may be particularly advantageous when used in shallow bodies of fluid where additional pumping force from more than a single pump is not required. In this embodiment, the filter fluid chamber 1720, comprising cross flow membrane 1722, extends to the top surface 1708 of the pressure chamber 1706. Water flows directly from the interior of the chamber 1720, through the top surface seal 1708 into the discharge tube 1740.

Figure 20:
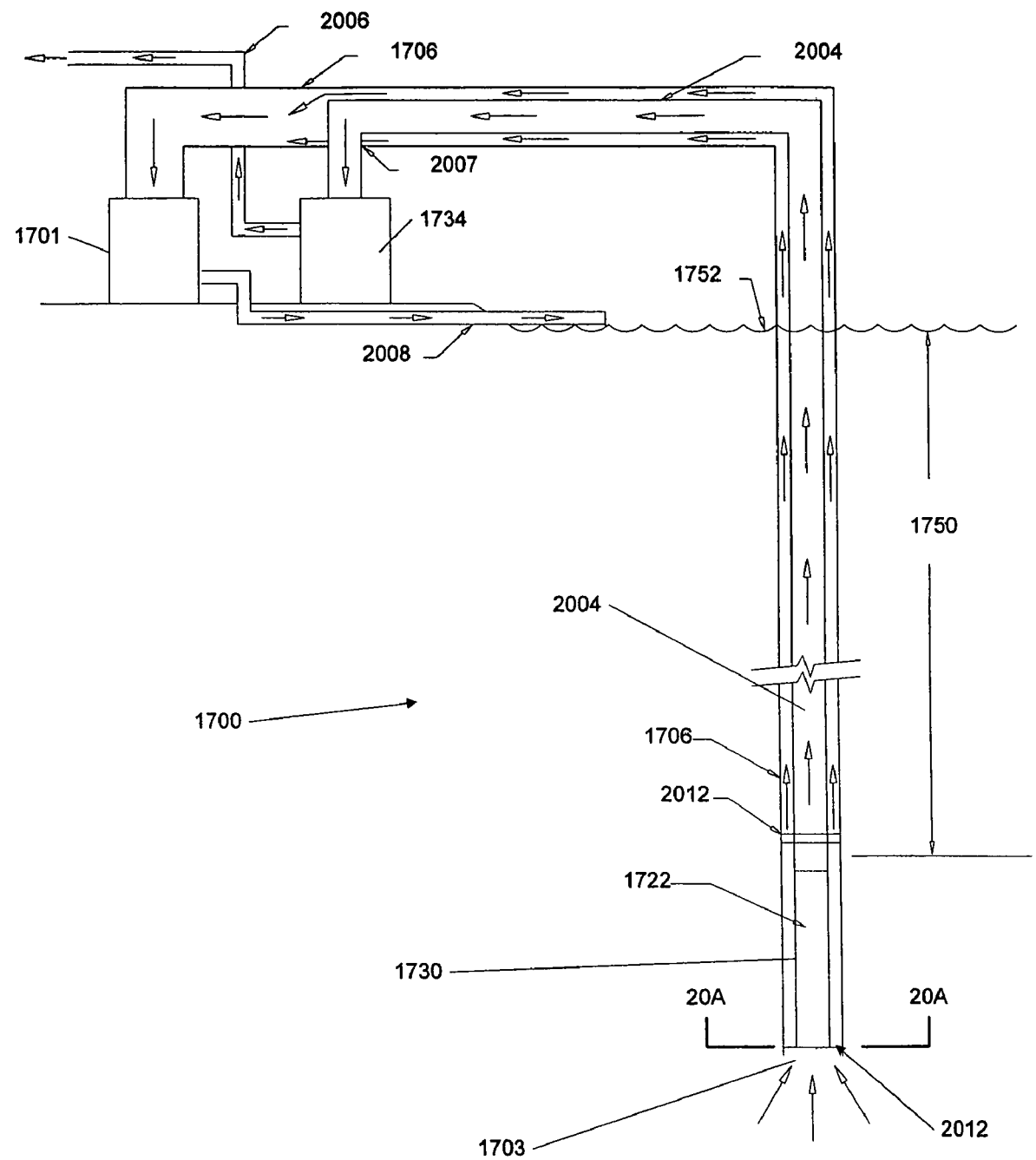
FIG. 20 depicts an embodiment of a cross flow filtration system similar to that of FIG. 17, but including non-submersible pumps.

FIG. 20 depicts still another embodiment of the filtering system 1700 which is similar to the embodiment of FIG. 19 but in which the pumps 1701 and 1734 are located above the surface of the body of fluid 1752 in place of submersible pumps. This surface pump arrangement may be advantageous in locations where submersible pumps are difficult to power or maintain. In this embodiment, the pump 1701 is fluidly connected to an outer suction tube 1706. The outer suction tube 1706 surrounds the filtered fluid chamber 1720 and cross flow membrane 1722. The pump 1701 pulls fluid in through the inlet 1703, and past the membrane 1722. The portion of the fluid having a concentrated level of impurities flows through the tube 1706, to the surface, and then is discharged back to the fluid body via the discharge tube 2008. The portion of the fluid that passes through the membrane 1722 flows through the suction tube 2004 which is fluidly connected to the chamber 1720, to the pump 1734, and out thorough a clean fluid discharge 2006. In one embodiment, the suction tube 2004 is centered within the tube 1706 by centering rings 2012, which may be placed at the ends of the filtered fluid chamber 1720. A discharge tube 2004 passes through a sealed opening 2007 in the tube 1706 in order to exit the interior of the tube 1706 and then to bring filtered fluid out of the system 1700 via pump the 1734.

Figure 20A:
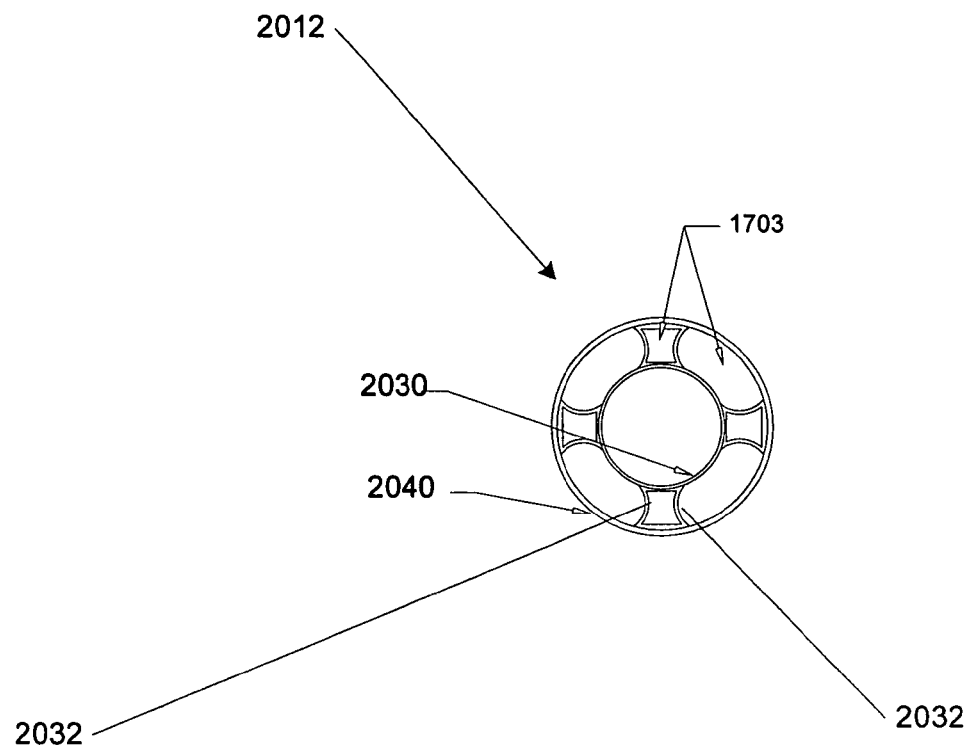
FIG. 20A depicts a top cross section view of portion of the filter system taken along line 20A-20A of FIG. 20.

FIG. 20A depicts a detailed cross sectional view of one embodiment of the centering ring 2012 taken along a line 20A-20A. An outer member 2040, which may fit in contact with an inner surface of the tube 1706, is coupled to an inner member 2030, which may fit in contact with an outer surface of the tube 2004, by a set of struts 2032. The open areas between the struts 2032, which extend from the inner member 2030 to the outer member 2040, form the inlets 1703.

Figure 21:
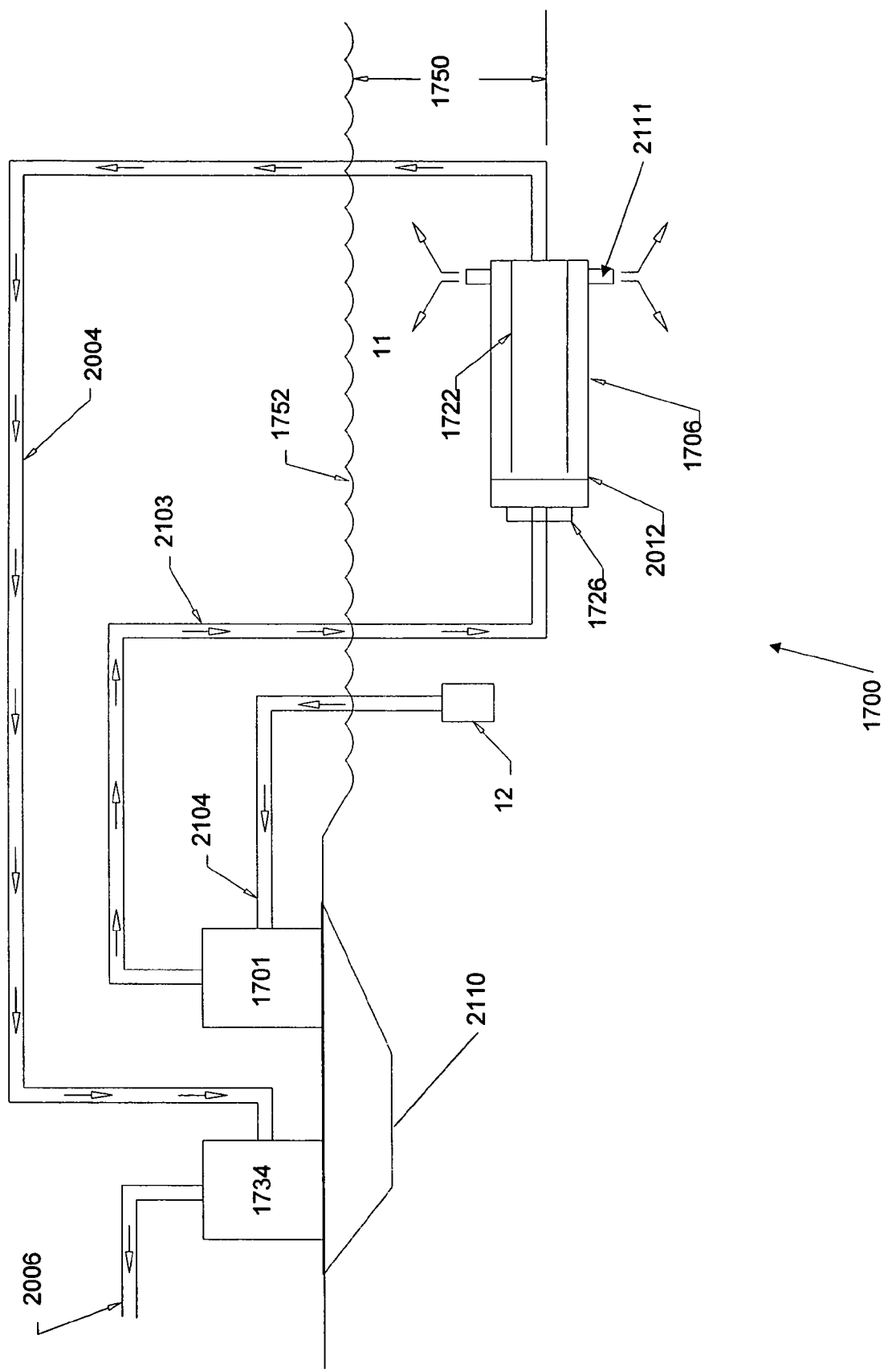
FIG. 21 depicts another embodiment of a cross flow filtration system similar to that of FIG. 20 but with non-concentric inlet and outlet pipes coupled to the cross flow membrane.

FIG. 21 depicts an embodiment of the filtering system 1700 that is similar to the embodiment shown in FIG. 20, but with the tubes 2004 not placed within the tube 1706. The pump 1701 is used to supply pressure to cause fluid to flow along the filter membrane 1722, while the pump 1734 supplies suction creating the pressure differential across the membrane 1722. The filter may be placed at a depth 1750 below the surface of the fluid body to provide additional pressure around the outside of the filter membrane 1722 and inside the pressure tube 1706. Some embodiments may also comprise the seal 1726 and the vent tube 970 (not shown). If pre-filtration is required, the self cleaning filter 12 may be placed on the dirty fluid suction tube 2104. In operation, fluid flows through a tube 2104, through pump 1701, and on through tube 2103, after which it enters the pressure chamber 1706 via the seal 1726. A portion of the fluid passes along filter 1722 and out through the discharge tubes 2111. A second portion of the fluid flows across membrane 1722 and then through tube 2004 and out clean discharge tube 2006 via pump 1734. The portion of fluid that passes along the membrane 1722 and out through the discharge tubes 2111 helps to minimize clogging and following of the filter membrane 1722. Advantageously, this arrangement of fluid inlets and outlets allows initially filtered fluid, from filter apparatus 12 to be removed from one location in the fluid body where, for example, sediment is less likely to fowl the filter apparatus 12. Finer filtration, such as, for example, reverse osmosis filtering, may then occur through the membrane 1722 at another location in the body of fluid that has, for example, current flow that disperses the concentrated impurities that remain from the filtering action of the membrane 1722.

As will be apparent to one of skill in the art, if pumps, such as 1701 are placed on a stable surface 2110, the filter system 1700 may also function as the filter vibration devices, such as in a manifold 250 as discussed with respect to, e.g., FIG. 7, or such as discussed below with respect to, e.g. FIGS. 23A-C and 24.

Figure 22:
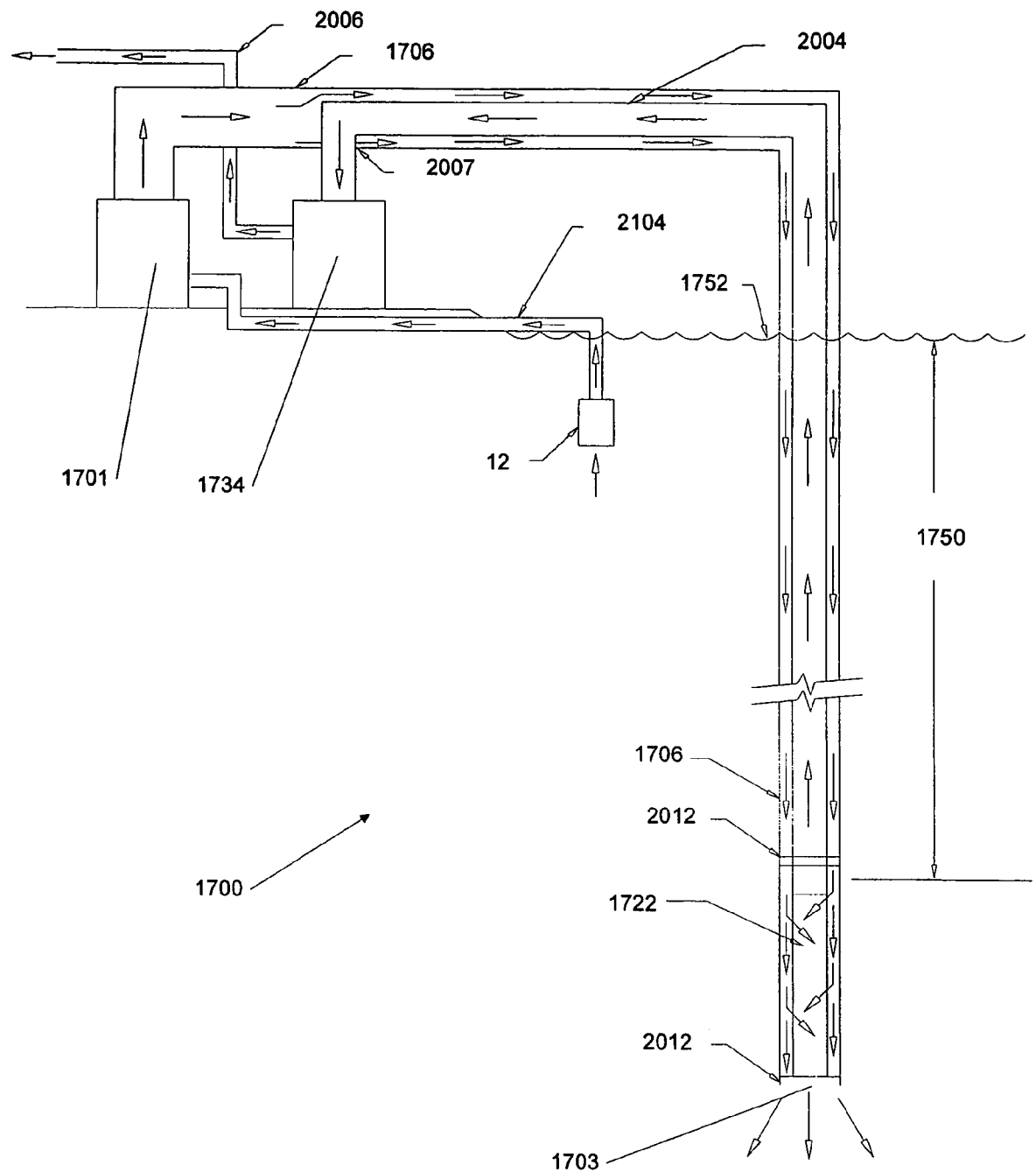
FIG. 22 depicts another embodiment of a cross flow filtration system similar to that of FIG. 20, but having the travel of flow across the exterior of the cross flow membrane in the opposite direction of the flow within the discharge pipe.

FIG. 22 depicts an embodiment of the filtering system 1700 in which fluid flows into the filter system 1700 through the self-cleaning filter 12 as described with respect to FIG. 21 but with a concentric pipe arrangement for cross flow filtering as described with respect to FIG. 21. Thus, this embodiment combines the advantages discussed with respect to FIG. 21 but with the convenient single pipe assembly of FIG. 20. Thus in operation, fluid enters the pipe 2104 via the filter apparatus 12 and is forced by the pump 1701 into the pressure tube 1706. From there is similar to the flow described with respect to FIG. 20, however, the fluid flow direction in the tube 1706 is opposite to the direction of flow of fluid in the tube 2004. Thus, fluid exits through the inlet 1703 formed by centering ring 2012 rather than entering through the inlet 1703.

It has also been discovered that while performing ionic, molecular, micro and particle filtration, vibration of a filter during back flushing or cross flow filtration greatly improves the efficiency of filtering. Vibration also reduces fouling of the filters and thus reduces maintenance costs associated with operation of a filtering system. In addition to vibrating the manifold 250, as discussed with respect to FIGS. 8A and 8B, other embodiments of a filtering system may be constructed in which vibration devices powered by the flow of the filtered medium, or the backflushing medium. Embodiments of filtering apparatus 12 or filtering system 1700 as described herein may further comprise vibrators 2300 such as those depicted in FIGS. 23A-23C wherein a tube 2302 coupled to the vibrator 2300 is further coupled to a tube such as, for example, back flushing supply tubes 40, or discharge or suction tubes 26 to prevent sediment buildup on the filter and to improve sediment removal during back flushing. The vibrator 2300 may be powered by a flow of fluid within the attached filtering system. For example, in one embodiment, the vibration device may be powered by a portion of fluid from the flow of filtered fluid through the system. The vibrator 2300 may thus be configured to continuously vibrate during filtering operation. In another embodiment, the vibration device 2300 may be coupled to a pipe carrying fluid for backflushing. The vibrator 2300 may thus be configured to vibrate during backflushing.

FIGS. 23A, 23B, and 23C each depict embodiments of flow powered vibrators 2300 based on a wheel 2310, which respectively have imbalancing features that comprise: an imbalancing weight 1308, an off-center axis mounting and, a shape generally defining an ellipse. A vibrator 2300 may be connected at any suitable location to a filtering system as discussed above. For example, a vibrator may be fluidly coupled to the filtered fluid pipe 26 or the supply pipe 40 of the self cleaning filter 12. If coupled to the filtered fluid pipe 26, the vibrator 2300 may be configured to vibrate continuously as the fluid is filtered by the filter apparatus 12. If coupled to the back flush supply pipe 40, the vibrator 2300 may be configured to vibrate during back flushing of the filter apparatus 12.

FIG. 23D depicts a top view corresponding to each of these three embodiments taken along a line A-A in each of FIGS. 23A, 23B, and 23D. In each embodiment, a tangential flow rotates the paddles 2301 on each wheel 2310 which, due to the imbalancing features of each wheel embodiment 2310, produces vibration in the form of periodic motion of the apparatus 2300 along line 2303. The wheel 2310 may be coupled via axles 2312 to flanges 2314. The flanges 2314 are coupled to a mounting plate 2307 via a bracket 2305. The mounting plate 2307 may form one side of a vibration chamber 2306 in which a portion of the wheel may be recessed from a tube 2302. The tube 2302 may be coupled inline to, for example, a back flushing supply tubes 40, and thus configured to vibrate during backflushing, or the discharge or suction tube 26, and thus configured to vibrate continuously during operation. In each embodiment shown in FIGS. 23A, 23B and 23C, the wheel 2310 rotates along an axis that does is misaligned with respect to the center of mass of the wheel 2310. Thus, rotation of the wheel generates a periodic force along line 2303 as the center of mass of the wheel defines an orbit around the axle 2312. The force along line 2303 is transmitted via the axles 2312 and flanges 2314 so that the entire apparatus 2300 moves periodically back and forth in a vibratory motion.

In particular the embodiment depicted in FIG. 23A, the weight 2308 is coupled to one side of the wheel 2310, thereby unbalancing the wheel 2310 and thus inducing vibrations as it rotates as described above.

FIG. 23B depicts an embodiment of the vibrator 2300 in which the wheel 2310 is mounted by the axles 2312 that are placed at a point that does not correspond to the center of mass of the wheel 2310. Thus, off-center rotation of wheel 2310 again results in vibration of the tube 2302.

FIG. 23C depicts an embodiment of the vibrator 2300 in which the wheel 2310 defines an ellipse. The uneven distribution of mass in the wheel 2310 thus vibrates the chamber 2306 when the wheel 2310 spins in response to fluid (including gas) flow through tube 2302.

Figures 24, 24A, 24B:
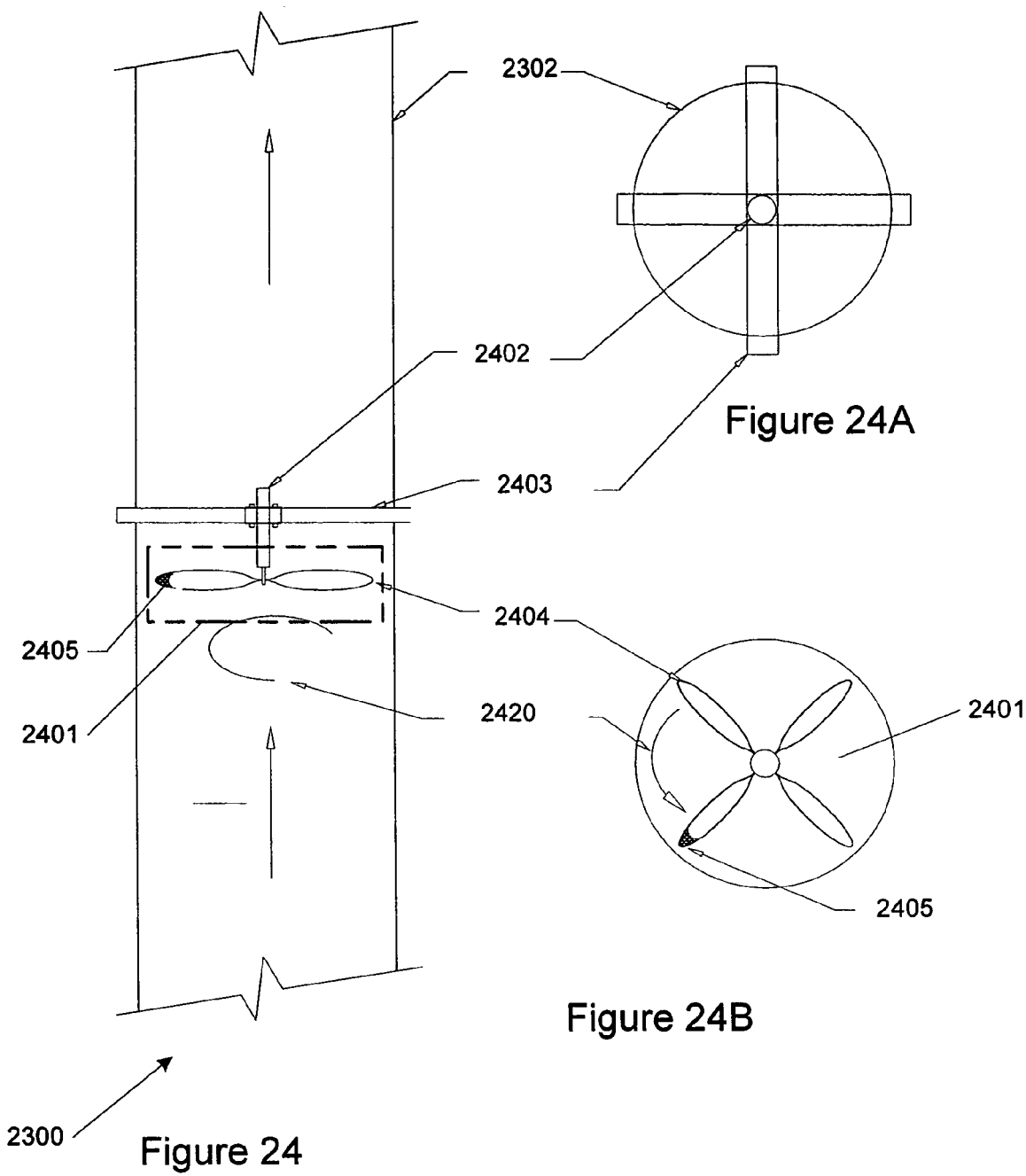
FIG. 24 depicts another embodiment of the vibration device, such as in FIG. 23A, for reducing caking or clogging in a filter system.
FIG. 24A depicts a top view of the mount for an embodiment of the vibration device of FIG. 24.
FIG. 24B depicts a top view of a propeller in an embodiment of the vibration device of FIG. 24.

FIG. 24 depicts another embodiment of the vibrator 2300 of the invention. The embodiment of FIG. 24 comprises a rotor 2401 with a weight 2405 coupled to one of a plurality of fins 2404. The rotor 2401 may be mounted to a shaft 2402, which is coupled to a mount 2403 on the inside of the tube 2302. The flow of fluid in the tube 2302 rotates the rotor 2401 in the direction of arrow 2420. The imbalance caused by the weight 2405 induces a vibration or oscillation in the vibrator 2300. FIG. 24A depicts a top view of the mount 2403 which couples the rotor 2401 to the tube 2302 via an axle 2402. FIG. 24B depicts an embodiment of the rotor 2401 having four fins 2404, one of which is coupled to the imbalancing weight 2405.

Each of the embodiments of the vibrator 2300 may be coupled to the supply tube 40 or the discharge tube 26 and then to a filter, as for example, in self cleaning filter 12 and/or the membrane 1722.

In view of the above, one will appreciate that he invention overcomes the longstanding problem of providing a self-cleaning filter assembly that can be used with existing submersible pumps or other pumps during pumping operations. A submersible pump or a suction line can be inserted into the filter basket and then placed into a fluid source such that particulate material is screened from the fluid by a filter element. The screened particulate material can then be dislodged or expelled from the surface of the filter element during pumping operations without having to stop the operation or remove the filter element from the fluid source.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A filter apparatus for use with a pump, the filter apparatus comprising:
   a filter element;
   a first supply line for delivery of a flushing medium;
   a second supply line for delivery of an enhancing material;
   a filter basket at least partially enclosed in the filter element, and wherein the filter basket comprises:
   a manifold, comprising:
      a first member having a first opening so as to receive the first supply line and a second opening so as to receive the second supply line;
      a second member having a first plurality of apertures and a second plurality of apertures;
      the first and second members defining a first internal chamber fluidly connecting the first opening with the first plurality of apertures;
      the first and second members defining a second internal chamber fluidly connecting the second opening with the second plurality of apertures;
   a first plurality of tubes at least partially enclosed in the filter element, wherein each tube of the first plurality of tubes extends from one of the first plurality of apertures and includes a first plurality of perforations such that a flushing medium may flow from the first supply line through the internal chamber into the first plurality of tubes and through each of the first plurality of perforations to backflush the filter element; and
   a second plurality of tubes at least partially surrounding the filter element, wherein each tube of the second plurality of tubes extends from one of the second plurality of apertures and includes a second plurality of perforations such that a enhancing material may flow from the second supply line through the internal chamber into the second plurality of tubes and through each of the second plurality of perforations.

2. The filter apparatus of claim 1, further comprising a second filter element at least partially enclosing the second plurality of tubes.

3. The filter apparatus of claim 1, wherein the enhancing material comprises a flocculent.

4. The filter apparatus of claim 1, wherein the enhancing material comprises a disinfection agent.

5. The filter apparatus of claim 1, wherein the first supply line is coupled to a vent line coupling the second internal chamber to the atmosphere.

6. The filter apparatus of claim 5, wherein the vent line is configured to create a pressure differential across the filter element.

7. The filter apparatus of claim 1, wherein the enhancing material comprises a coagulant.

8. The filter apparatus of claim 1, wherein the coagulant comprises iron particles.

9. The filter apparatus of claim 1, wherein the enhancing material comprises a viscosity reducing agent.

10. The filter apparatus of claim 9, wherein the viscosity reducing agent comprises steam.

11. The filter apparatus of claim 1, wherein the filter apparatus is configured to filter oil.

12. The filter apparatus of claim 1, wherein the filter apparatus is configured to filter air.

* * * * *